(12) United States Patent
Gunther et al.

(10) Patent No.: US 9,463,825 B2
(45) Date of Patent: Oct. 11, 2016

(54) GEAR RACK STEERING GEAR HAVING A PROGRESSIVE REDUCTION

(71) Applicant: SchmitterGroup AG, Thungen (DE)

(72) Inventors: Friedhelm Gunther, Dortmund (DE); Marco Schmidt, Thungen (DE); Ralf Dirscherl, Thungen (DE)

(73) Assignee: SchmitterGroup AG, Thungen (DE)

( * ) Notice: Subject to any disclaimer, the term of this patent is extended or adjusted under 35 U.S.C. 154(b) by 77 days.

(21) Appl. No.: 14/379,518

(22) PCT Filed: Feb. 20, 2013

(86) PCT No.: PCT/EP2013/053365
§ 371 (c)(1),
(2) Date: Oct. 24, 2014

(87) PCT Pub. No.: WO2013/124308
PCT Pub. Date: Aug. 29, 2013

(65) Prior Publication Data
US 2015/0040693 A1 Feb. 12, 2015

(30) Foreign Application Priority Data
Feb. 20, 2012 (EP) .................................... 12156225

(51) Int. Cl.
*B62D 3/12* (2006.01)
*F16H 19/04* (2006.01)
*F16H 55/28* (2006.01)

(52) U.S. Cl.
CPC ................. *B62D 3/126* (2013.01); *B62D 3/12* (2013.01); *F16H 19/04* (2013.01); *F16H 55/28* (2013.01); *Y10T 74/18088* (2015.01)

(58) Field of Classification Search
CPC ........ B62D 3/123; B62D 3/126; B62D 3/12; F16H 55/282; F16H 19/04; F16H 55/28; Y10T 74/1967; Y10T 74/18088
See application file for complete search history.

(56) References Cited

U.S. PATENT DOCUMENTS 5,174,407 A * 12/1992 Shimizu ................. B62D 1/166
180/444
5,265,691 A * 11/1993 Konishi ................. B62D 3/123
180/400

(Continued)

FOREIGN PATENT DOCUMENTS

DE          707 505 C        6/1941
DE          195 08 708 A1    9/1995

*Primary Examiner* — Darlene Condra
(74) *Attorney, Agent, or Firm* — Frank H. Foster; Kremblas & Foster

(57) ABSTRACT

A motor vehicle steering gear with a gear rack and a drive pinion that meshes with it, which drive pinion comprises a rigidly attached drive projection in a rotational bearing that is on a front face and eccentric to the pinion teething for coupling a motor vehicle steering spindle, said rotational bearing being guided in a direction transverse and parallel to a diametrical plane formed by the pinion teething, such that when the pinion is rotating, compensation strokes for the rotational bearing are specified in a direction transverse to the gear rack, said compensation strokes being caused by the eccentric attachment of the drive projection, a retaining projection rigidly attached at a front face concentrically to the pinion teeth, the retaining projection being rotatably in engagement with the retaining piece that is guided within a gear housing parallel to the gear rack teeth, is and that during pinion rotation compensation strokes parallel with and at a constant distance to the gear rack teeth are specified, which compensation strokes are caused by the eccentric attachment of the driving projection.

23 Claims, 27 Drawing Sheets

(56) References Cited

U.S. PATENT DOCUMENTS

| | | | | |
|---|---|---|---|---|
| 5,386,879 A * | 2/1995 | Shimizu | ............... | B62D 1/166 180/400 |
| 5,489,004 A * | 2/1996 | Shimizu | ............... | B62D 1/166 180/400 |
| 6,000,491 A | 12/1999 | Shimizu et al. | | |
| 6,367,577 B2 * | 4/2002 | Murata | ............... | B62D 1/166 180/446 |
| 6,749,040 B1 * | 6/2004 | Menjak | ............... | B62D 3/123 180/443 |
| 2008/0034911 A1 * | 2/2008 | Bieber | ............... | B62D 3/123 74/422 |
| 2013/0036845 A1 * | 2/2013 | Amada | ............... | B62D 3/123 74/30 |
| 2014/0007716 A1 * | 1/2014 | Kometani | ............... | F16H 19/04 74/30 |
| 2014/0373650 A1 * | 12/2014 | Iwakawa | ............... | F16C 35/067 74/30 |

* cited by examiner

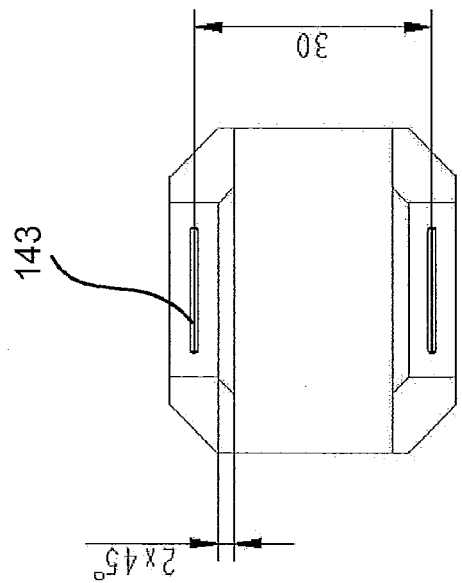
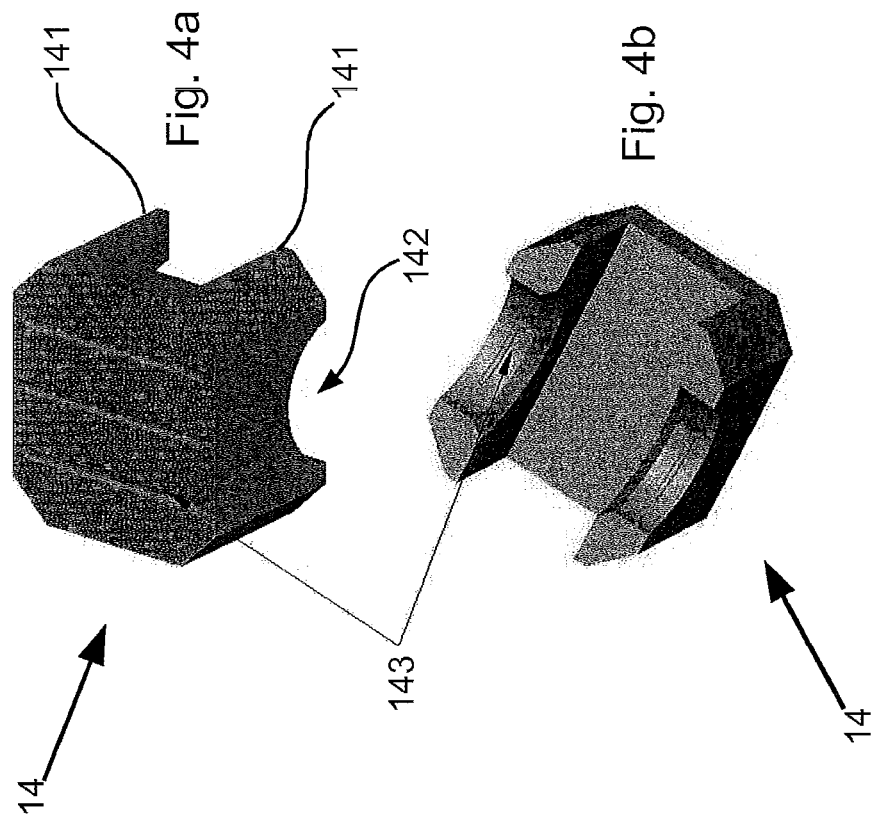
Fig. 4c
Fig. 4a
Fig. 4b

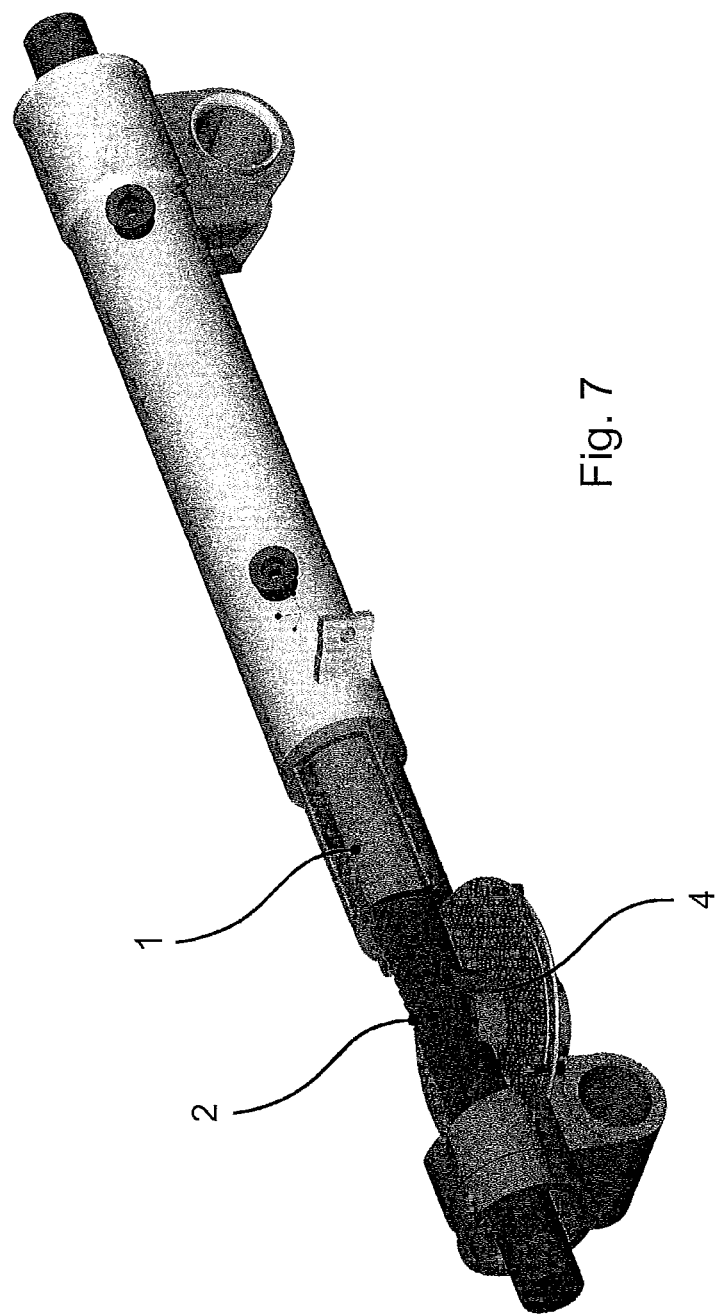

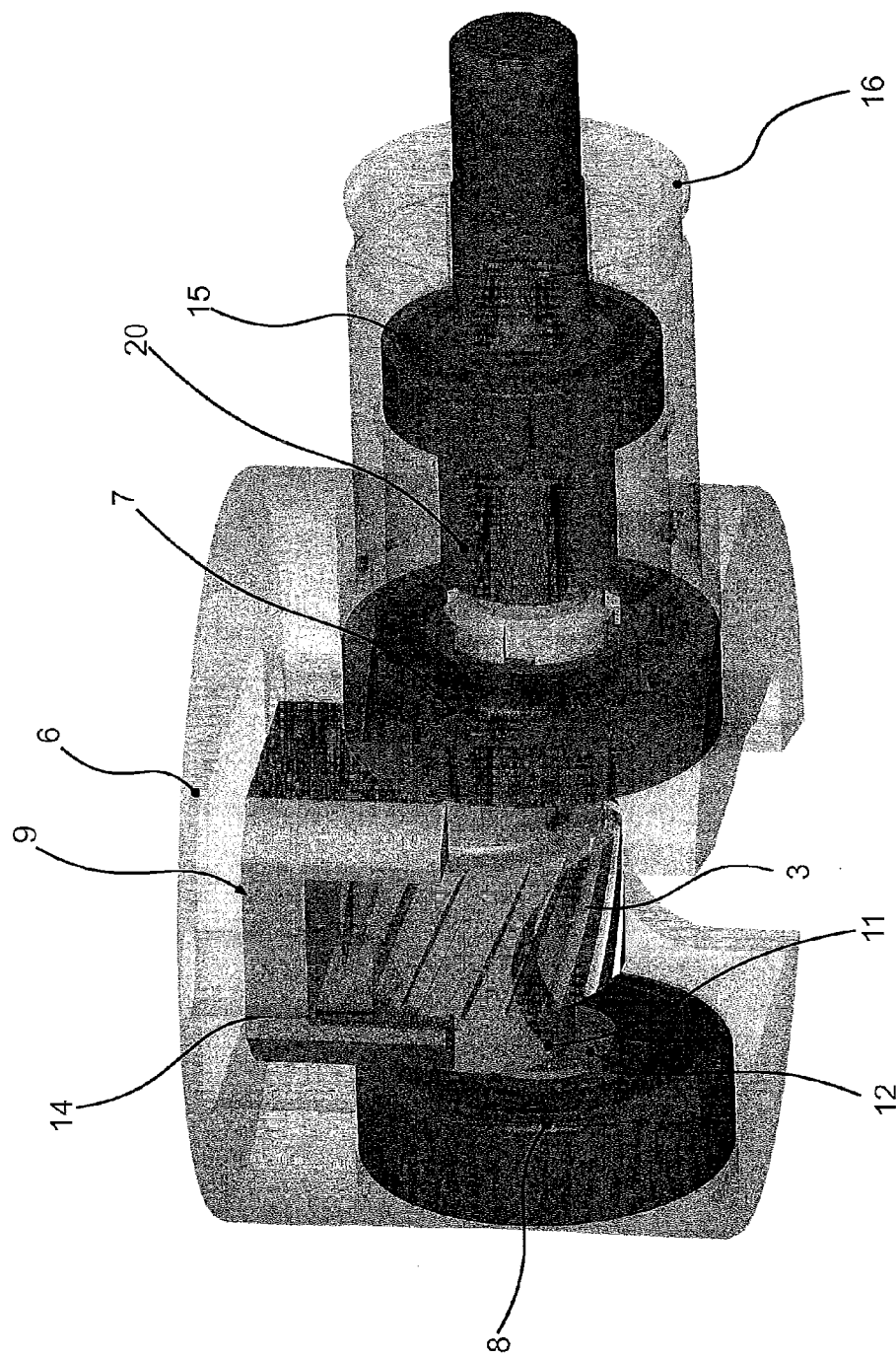

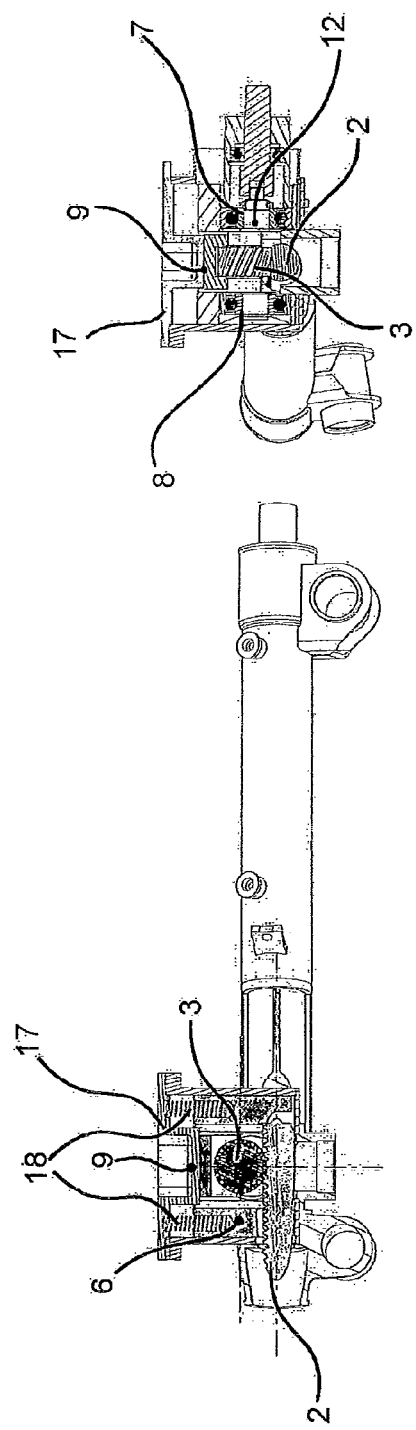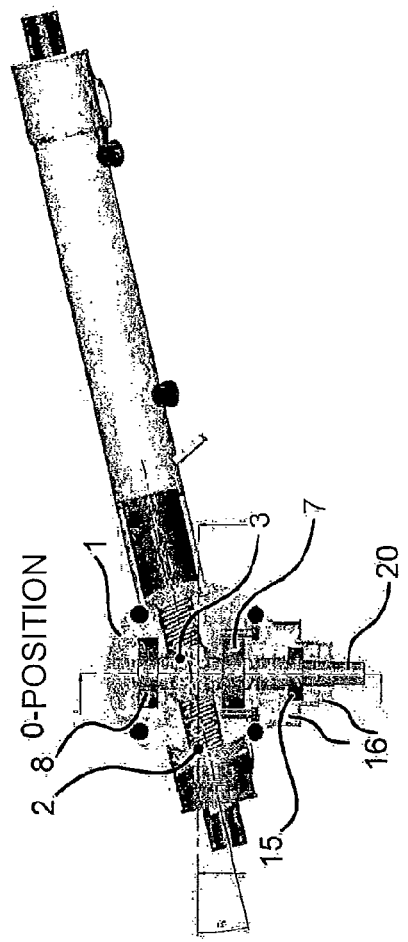
Fig. 14a
Fig. 14b
Fig. 14c

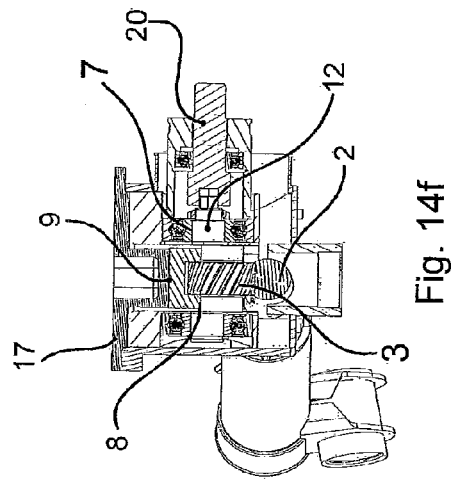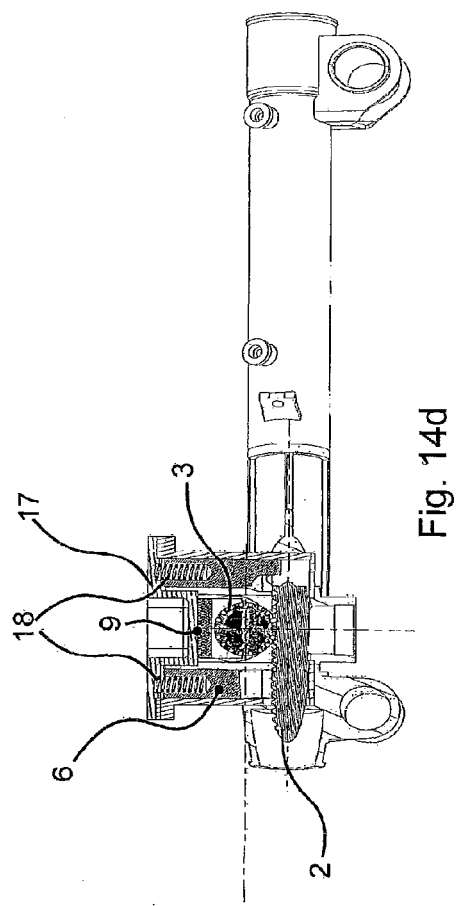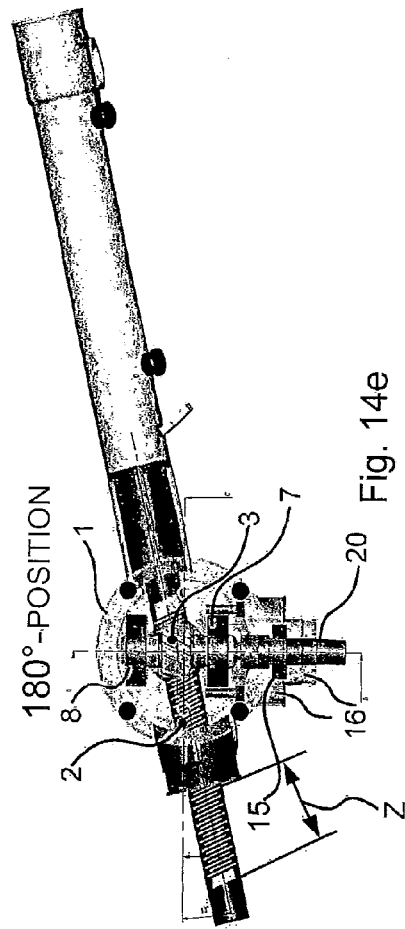

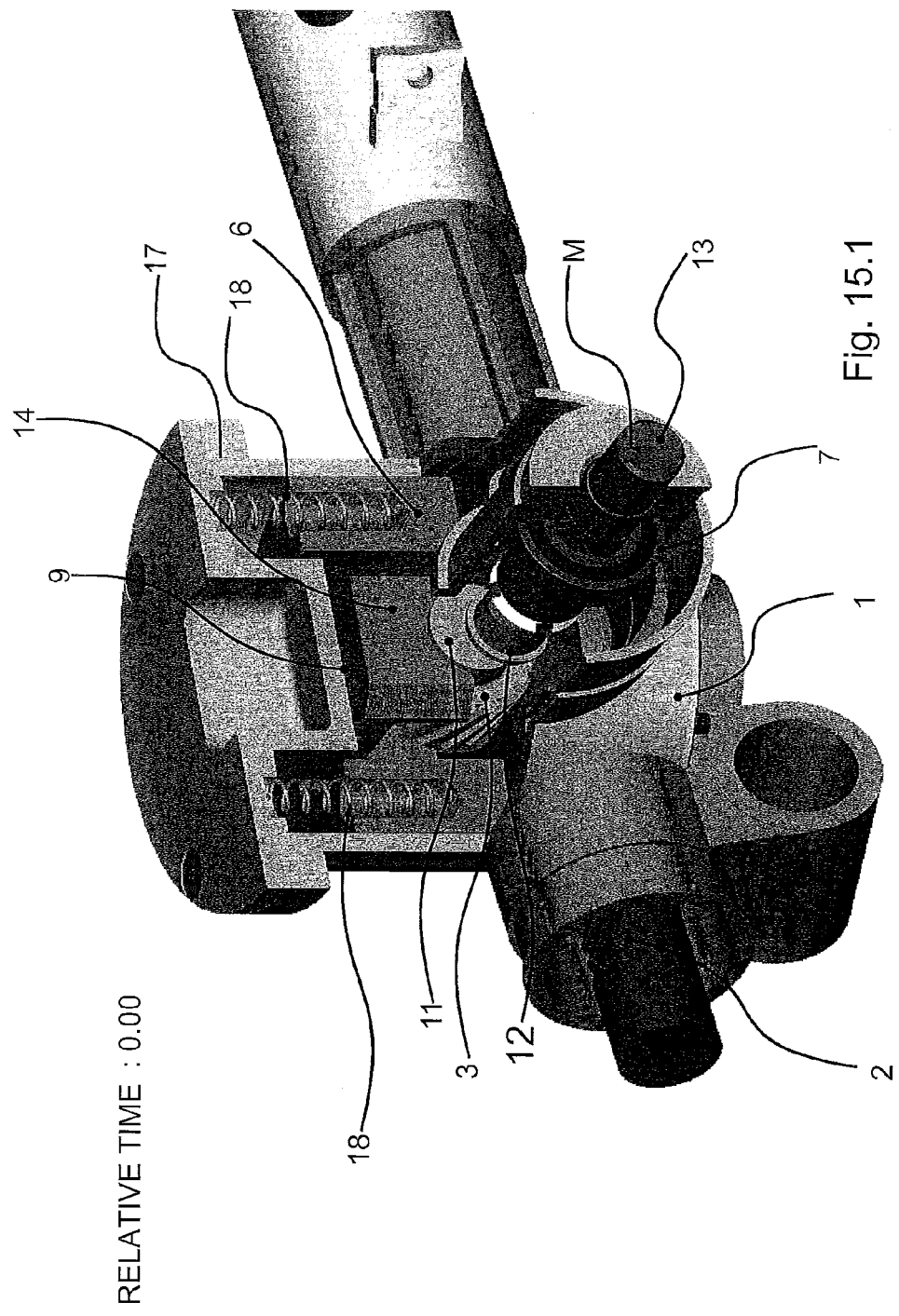
Fig. 15.1

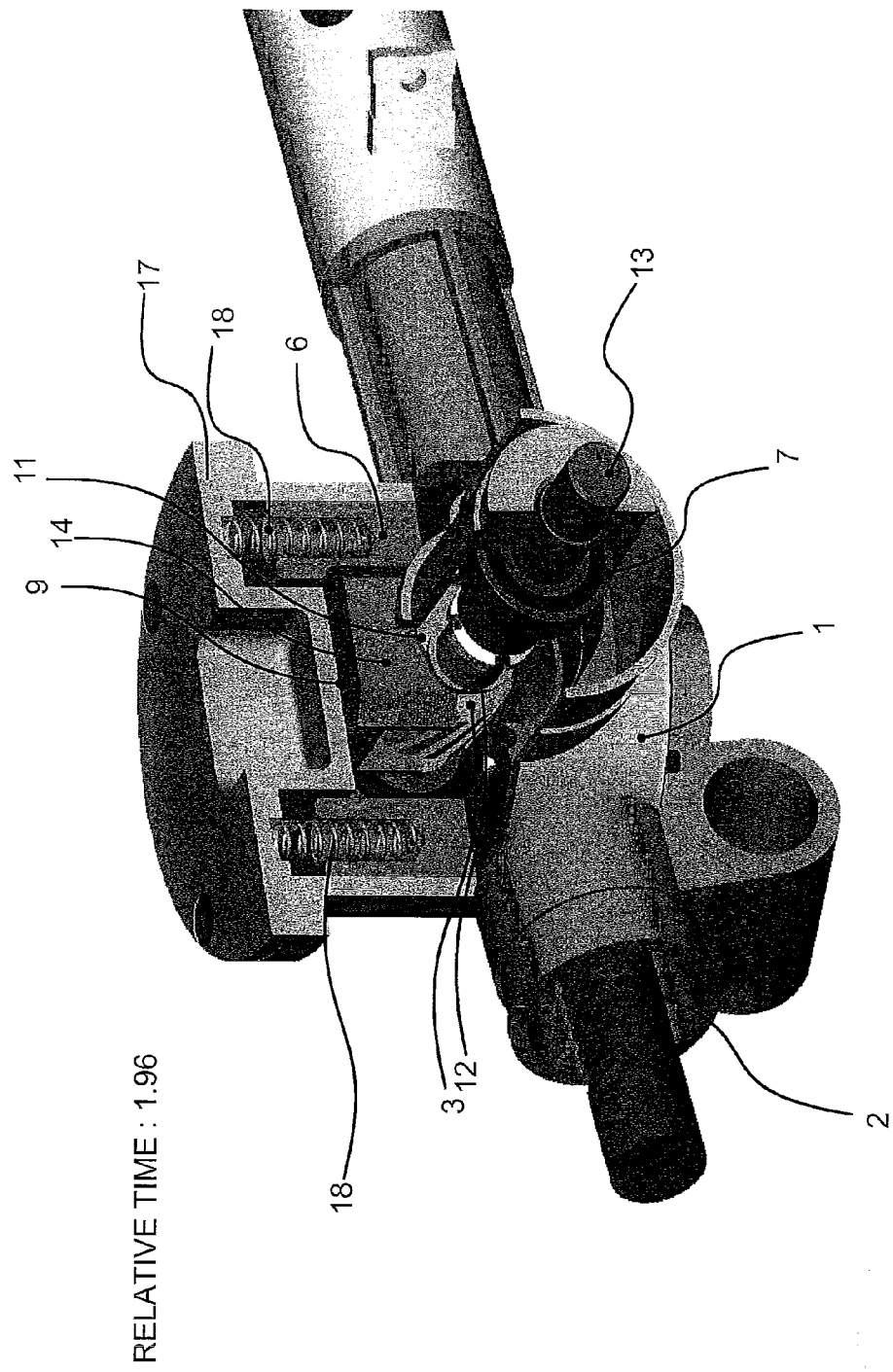
Fig. 15.2

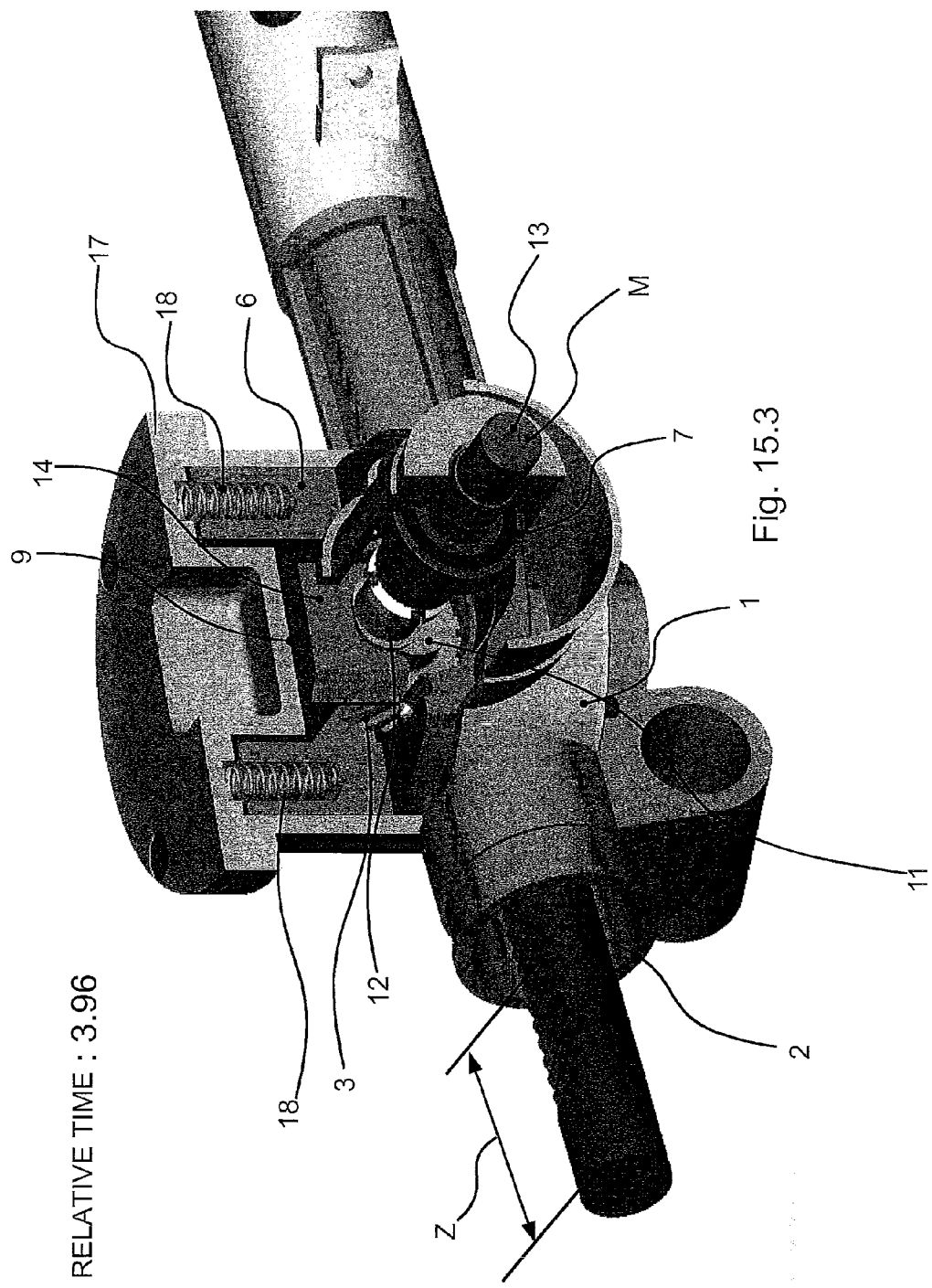
Fig. 15.3

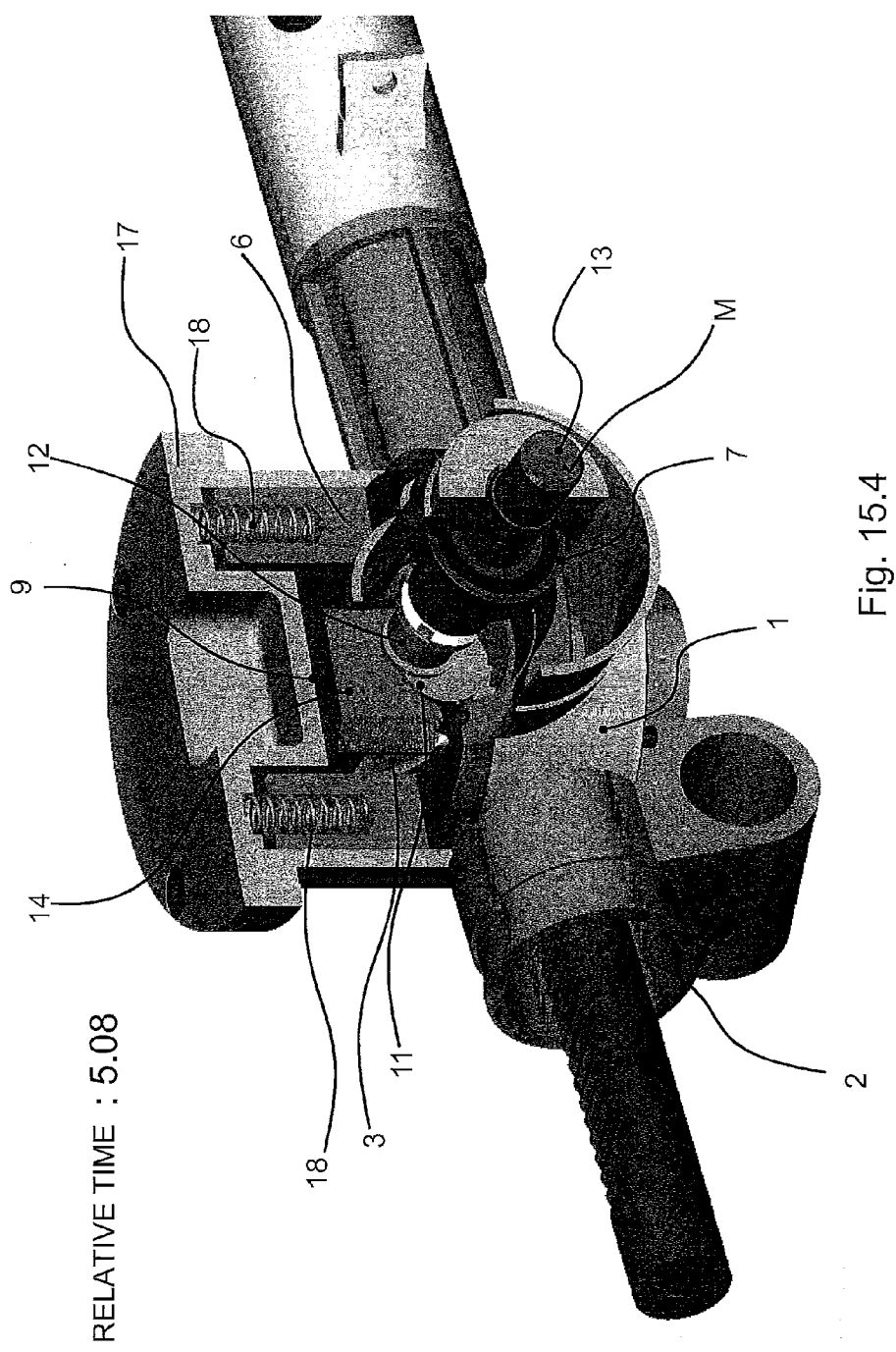
Fig. 15.4

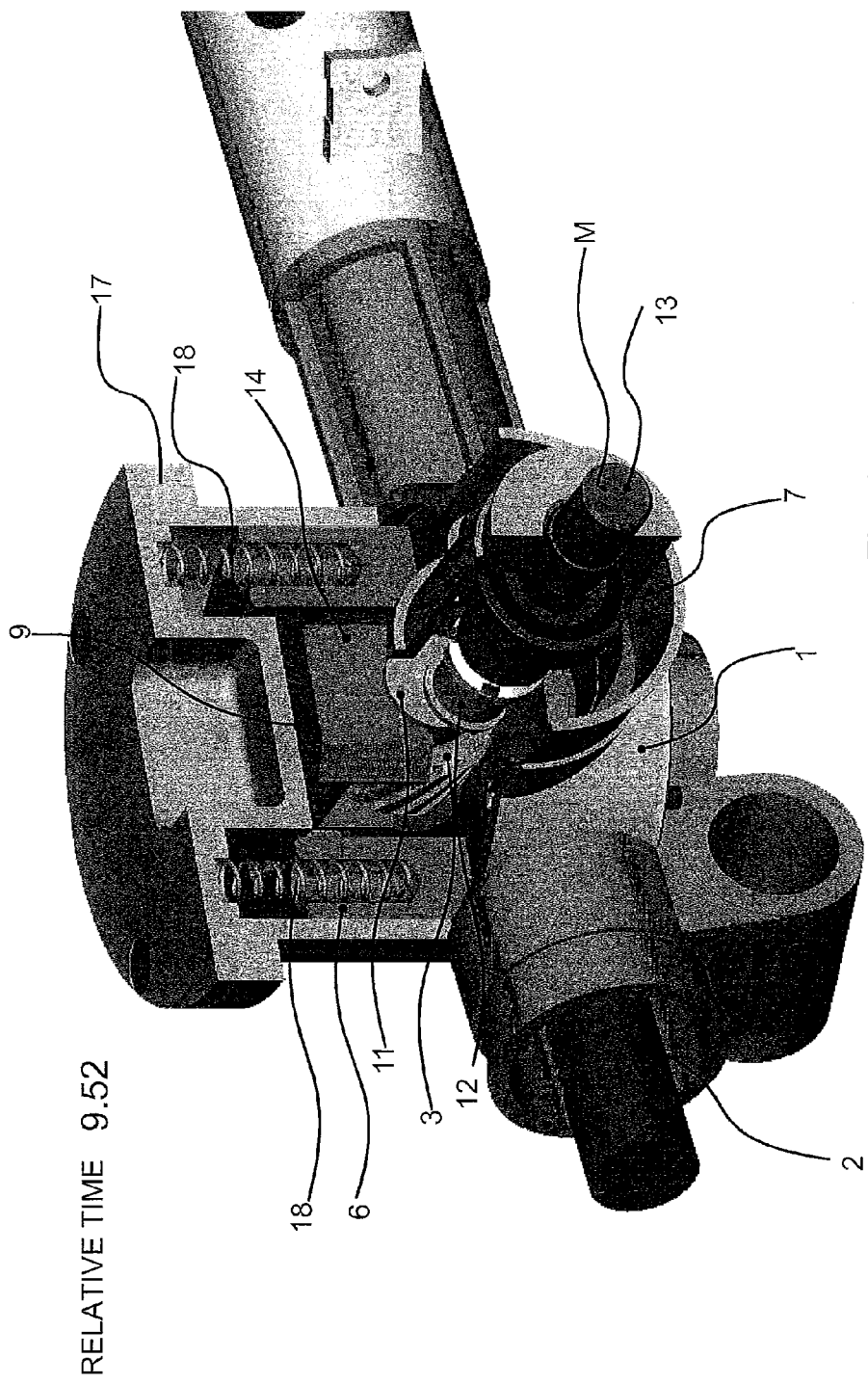

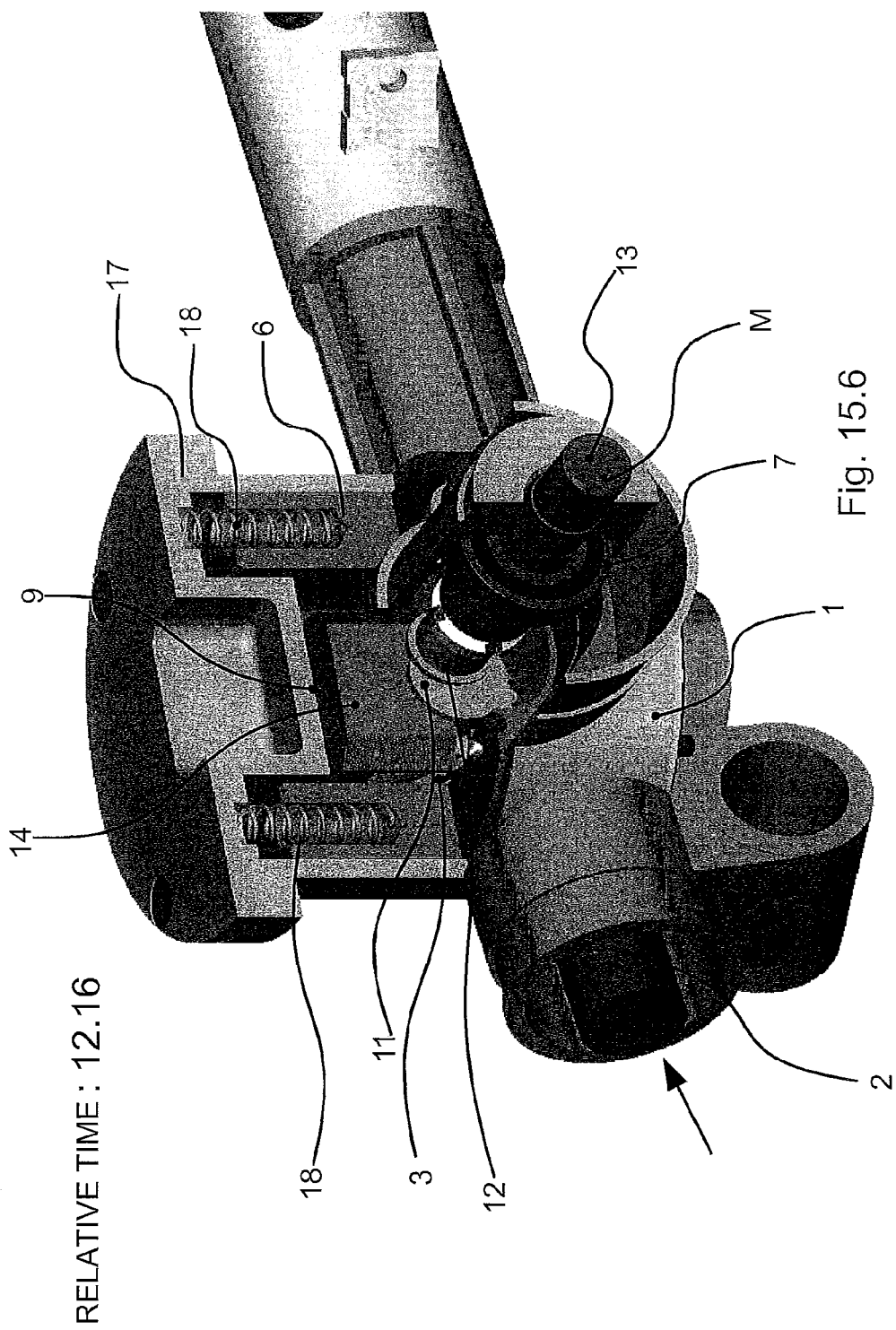
Fig. 15.6

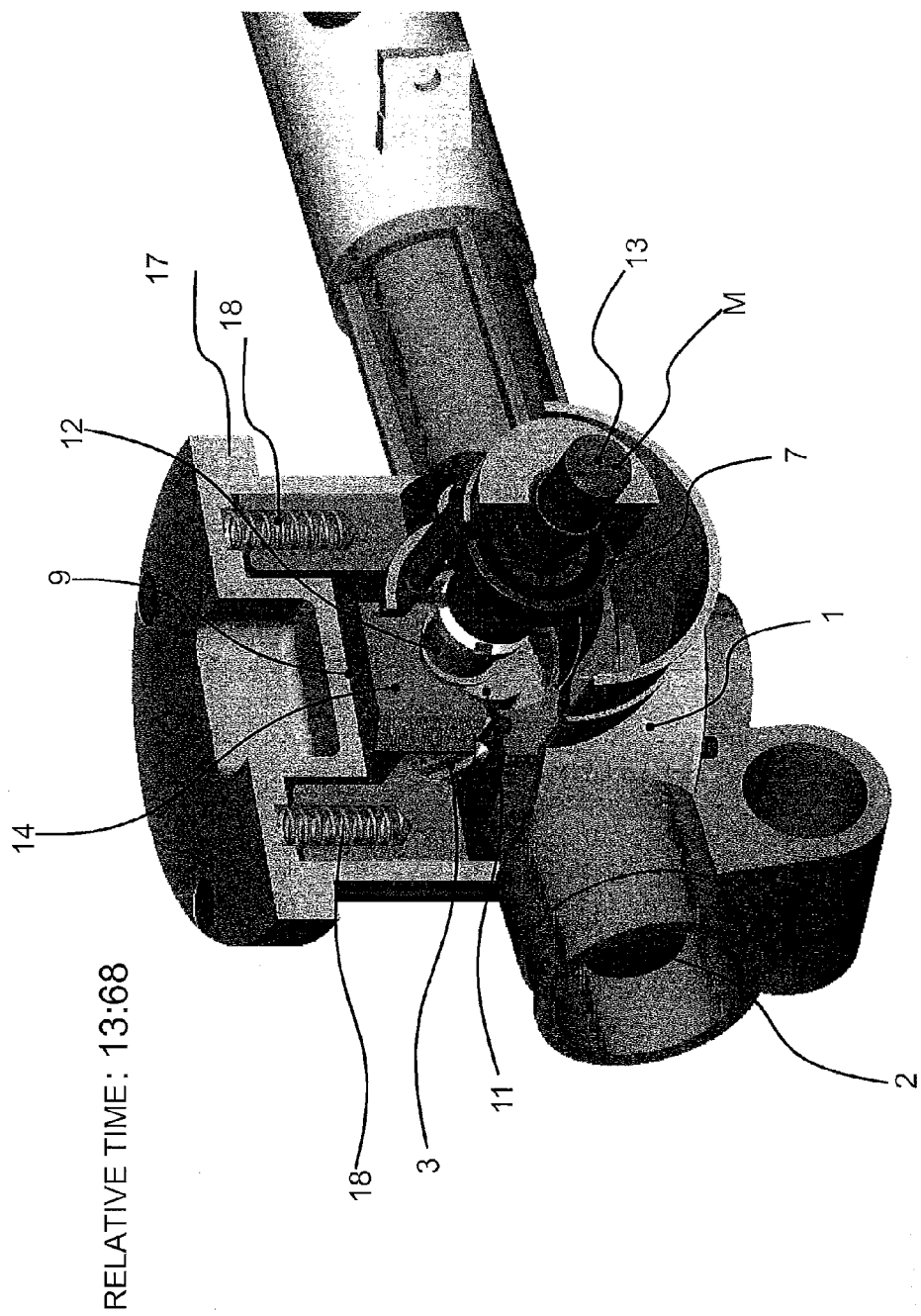
Fig. 15.7

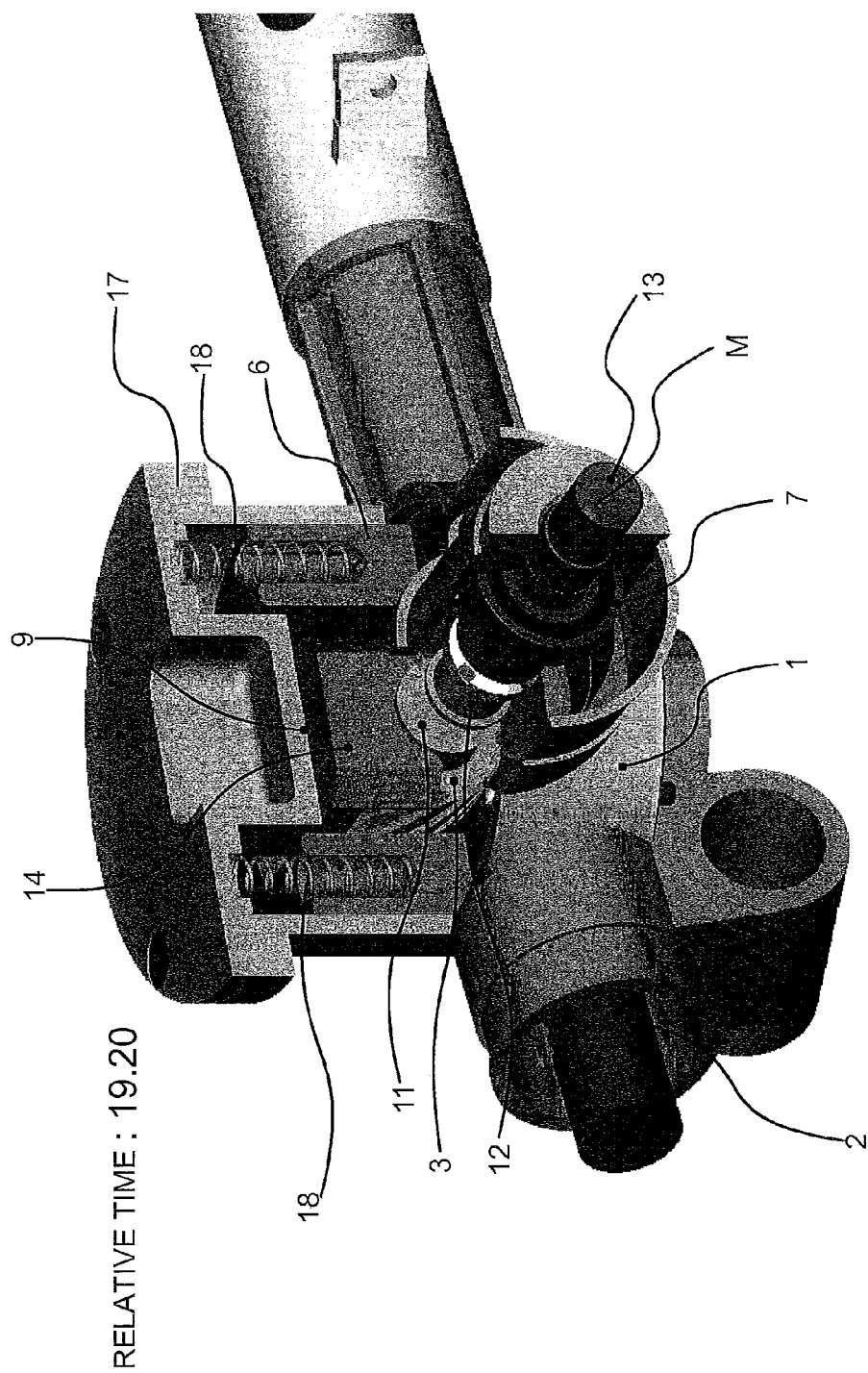
Fig. 15.8

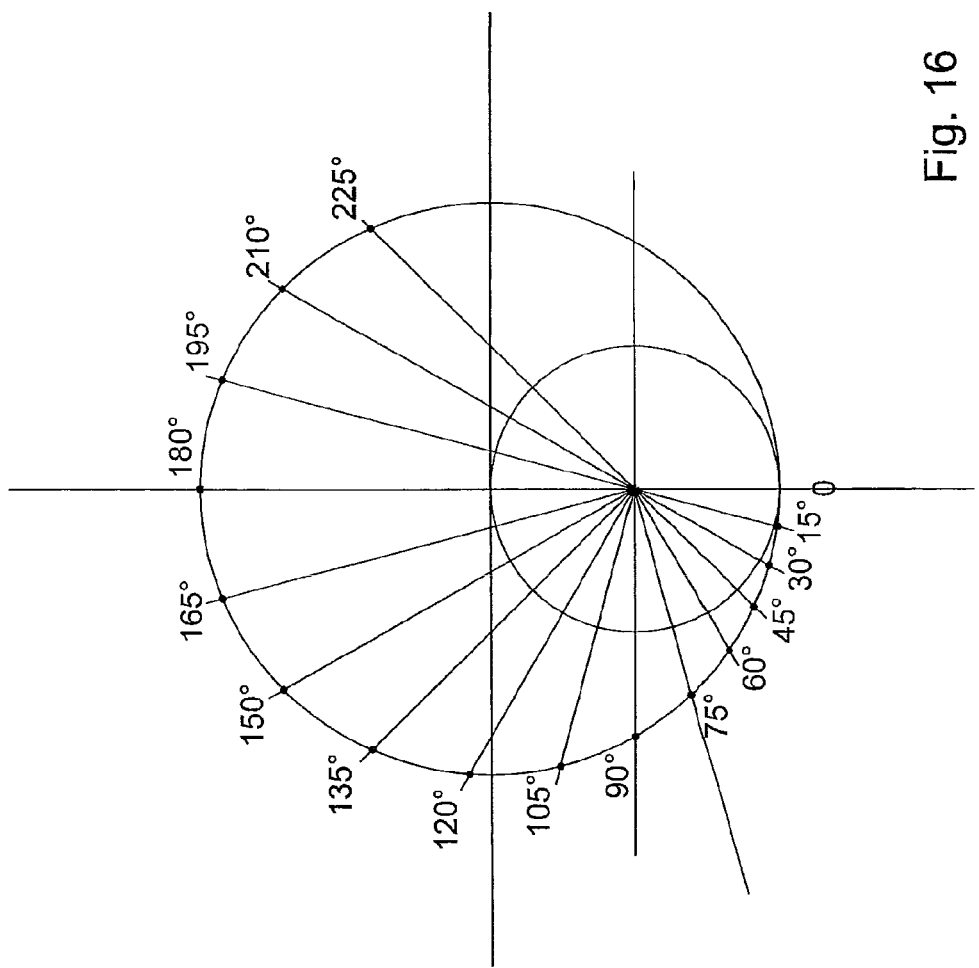

GEAR RACK STEERING GEAR HAVING A PROGRESSIVE REDUCTION

BACKGROUND OF THE INVENTION

The invention relates to a motor vehicle steering gear according to the respective generic part of claims 1 and 11. In that context, the guide which is mentioned therein which runs parallel to a front face formed by the pinion teeth also comprises the guide in a radial direction of the pinion teeth, if this is located in an initial rotary position corresponding to the rotary position of the steering wheel for straight-line driving.

The invention furthermore relates to a drive pinion that is suitable for the steering gear pursuant to the generic part of claim 7 or of claim 9 as well as a stroke housing or a guide piston for holding and linear guidance of at least one pivot bearing of an eccentrically disposed drive projection of a gear rack drive pinion pursuant to the generic part of claim 17.

Steering gears of the type mentioned at the outset are known from the patent specification DE 707 505 "Rack-and-pinion steering for motor vehicles." The drive pinion that meshes with the gear rack is placed into rotation by means of a drive journal that is screwed onto the front face in an eccentric position. The eccentric drive journal is pivoted in a bearing bush that is seated in a slide block. Said slide block is guided linear or translatory for executing the compensation movement caused by the eccentric mounting of the drive journal. With this known design, however, it has not been sufficiently ensured that a solid engagement remains between the drive pinion and the gear rack, particularly also in the event of any external bumps, such as when the vehicle to be steered is parked.

The object of the invention is to increase the reliability of the engagement between the gear rack and the pinion teeth for a steering gear with an eccentrically driven drive pinion. In order to solve the problem, reference is made to the motor vehicle steering gear cited in claim 1. Advantageous, optional developments of this invention result from the dependent claims.

SUMMARY OF THE INVENTION

It is therefore within the scope of the invention of providing additional support means for the gear rack/pinion teeth engagement. On the one hand, these could be realized on the drive pinion with one or multiple retaining projections, particularly journals, and on the other with a separate slide block or retaining piece. For example, retaining projections or journals could be mounted on both sides of each front face of the drive pinion (see claim 4). The retaining piece, which for example can be a slide block that can be moved to reciprocally along or on an inside of the housing, which can be suitably realized as to a loose part that is separately produced. In a further embodiment, it has a basic form shaped like a U, wherein the U shanks cover both front faces of the drive pinion at least partially. The front edges of the U shanks are expediently bulged concave, so that the U shanks can "ride" along the retaining projections of the drive pinion in a positively locked manner. In this sense, an optional embodiment is of the invention consists in that the retaining piece is designed as a loose separately manufactured slide block, preferably with a basic form shaped like a U to surround the front face of the drive pinion, wherein one or two shanks of the U-shaped slide block are preferably shaped with one retaining projection each, each of which has a shank front edge that is bulging concave, wherein the concavity is shaped complementary relative to the retaining projection (compare claim 4). In this regard, it is advantageous to provide one retaining projection on each front face of the drive pinion, so that the retention forces are pressing evenly distributed onto the drive pinion, which has a positive effect on the stability of the gear rack/pinion engagement (see claim 4).

It is useful, if the retaining piece is provided with a slideway on its outside, enabling it to make sliding compensating strokes on one inside of the housing. Correspondingly, an optional embodiment of the invention consists in that the gear housing has a backstop section on its inside that is opposite the retaining piece, where said backstop section is particularly designed as a slideway for parallel motion of the retaining piece (see claim 2). In this context, it is an advantage to realize the gear housing with a loose, separately manufactured housing cover, on the inside of which the slideway for the compensation strokes of the retaining piece are developed. The backstop section on the inside, in particular the slideway, is preferably positioned offset inward opposite of the cover base area (see claim 3). By designing the housing cover to be removable, this at the same time improves the serviceability of the steering gear, because said cover can be removed for servicing on the gear rack/pinion engagement.

One advantage that can be obtained with the invention consists in that numerous standard parts or components that are customary in steering gears, such as helical toothing etc., can still be used. In particular pursuant to an optional embodiment of the invention with the actually known sliding sleeve, in which the steering spindle is inserted telescopically, the compensation stroke which is caused by the eccentric drive can be absorbed or compensated, so that the steering wheel operator will practically not perceive the compensation strokes associated with the eccentric pinion drive.

Within the scope of the invention there is also a drive pinion, which, seen individually, is characterized by one or by several retaining projections is the love firmly connected onto the front face, each of which are rigidly connected onto the front concentrically relative to the (concentric) pinion teeth (see claim 7). A useful structural variant can be realized, which also favors the production of drive pinions with a smaller diameter, consist in that the drive projection is molded eccentrically onto the front face of the concentric retaining projection (see claim 8).

DE 707 505, discussed at the outset, teaches that the drive pinion be provided with an eccentric drive journal only on one front face. Compared with that, one alternative of the invention (see claim 9) improves the reliability and stability of the gear rack/pinion engagement in that an additional bearing projection is provided on the front face of the drive pinion that lies opposite the drive journal, which lies eccentrically opposite the pinion teeth. This bearing projection creates a further retaining element on the other front face of the pinion which, when held in a rotational bearing, can protect the pinion against tipping in the gear rack (see claim 9). The drive projection and the bearing projection will expediently lie commonly aligned on a common straight parallel to the center axis of the symmetry axis or the rotational axis of the pinion teeth (see claim 10).

To reset the steering into the neutral/straight-line driving, it is known that a torsion bar is used, which is an expensive component, however. The prior art according to DE 707 505 does not disclose anything for the automatic resetting of the steering.

The purpose of the invention furthermore is to improve the ease of operating a generic steering gear along with increased driving safety. This purpose is also served by a secondary alternative of the invention stated in claim 11, according to which the generic steering gear is provided with a compression spring or return spring mechanism, which is coupled on a gear housing with the rotational bearing of the drive projection such that the compression spring or return spring mechanism pushes the drive pinion with its pinion teeth into the toothing area of the gear rack and/or counteracts the compensation strokes of the rotational bearing for the purpose of resetting the drive pinion into the basic rotational position (see claim 11). In particular in this way, the drive pinion can be pushed into a rotational position that corresponds to straight-line driving (initial or zero position). The initial or zero position is preferably defined to the effect that at the same time the eccentric drive projection has the smallest distance to the gear rack; in other words, when the drive journal on the front face of the drive pinion is at its lowest position.

For the optimum deployment of the reset spring mechanism, it is advantageous to incorporate the rotational bearing (s) in a stroke housing or reciprocating piston, which is guided according to the above-mentioned compensation strokes of the drive projection. Then it is expedient, if the compression spring or reset spring mechanism on the stroke housing or reciprocating piston is applied (see claim 12).

The stability of the steering gear is beneficial, if according to an optional embodiment of the invention, a (further) rotary bearing protection is rigidly attached on the front face of the drive pinion eccentric relative to the pinion teeth. This rotary bearing projection can then be held in the cited guide pistons, or in a separate, second reciprocating piston that is also guided corresponding to the compensation strokes (see claim 13). This can be used to guard against tilt of the drive pinion in the toothing with the gear rack and to increase the reliability of meshing engagement. This effect can be facilitated even further with an optional embodiment of the invention, according to which the resetting spring or compression spring mechanism comprises several separate and/or spaced apart compression spring elements, which are evenly distributed or engaged symmetrically onto a second reciprocating piston or respectively on one of the separate reciprocating pistons (see claim 14).

To ensure a specific clearance in the meshing engagement between the drive pinion and the gear rack that facilitates functionality, it is expedient to provide an option for an adjustable retaining piece, which pushes to against or engages with a side of the gear rack facing away from the drive pinion (see claim 15). In order to size an appropriate gear and clearance functionality more accurately, a thread engagement is provided in a continuation of the cited embodiment. For this purpose, the retaining piece penetrates a wall of a gear housing from the outside (accessibility from outside), wherein the retaining piece for the purpose of its adjustability (for example with an intrinsic external thread) is engaged with an inside thread on the wall (see claim 16). By adjusting a specific clearance, in this way it is possible to guard against jamming of the steering.

The prior art, which has already been addressed above according to DE 707 505 shows that the rotational or drive journal that projects from the drive pinion is enveloped by a bearing bush that is seated in a slide block. The latter is guided in a slot link for vertical compensation stroke movements in accordance with the eccentricity of the pivot pin or of the drive journal. The guide pertains not to the entire drive pinion, however, so that the latter is not sufficient reliably held in meshing engagement with the gear rack. The slide block moving up and down envelopes only the bearing bush for the gear.

As a consequence, this highlights the objective on which the invention is based, to increase the stability of the meshing engagement between the gear rack and the drive pinion, as well as the guidance for the compensation strokes. To solve the problem, the stroke housing or the reciprocating piston is proposed, as it is cited in claim 17. According to this, the holding space in the stroke housing or in the reciprocating piston is designed for at least holding a linear reciprocally moving drive pinion with pinion teeth and eccentric rotational bearing. The holding space is expediently sized such that the drive pinion can move reciprocally with double the eccentricity with which the drive projection is offset with respect to the center axis of the pinion teeth (see claim 18). This accordingly applies for the retaining piece going into form-closed engagement with the drive pinion, in that the holding space is sized so that it can be held with its stroke movements occurring parallel to the gear rack (see claim 19).

For a solid fixation of rotational bearing components, it is expedient to provide one or several recesses in the wall of the stroke housing or of the reciprocating piston, which lead to the holding space and each of which is designed to hold a rotational bearing, and are specifically dimensioned or sized (see claim 20). Therefore, the advantage can be achieved that a double rotational bearing can be realized in particular, for example by two diametrically reciprocal rotational bearings relative to the center axis of the stroke housings or of the reciprocating piston, which ensure uniform seating of the drive pinion with a is stabilized meshing engagement with the gear rack.

It is also beneficial for solid meshing engagement, if according to one option of the invention, one or several engagement means are developed in the outer wall of the stroke housing or the reciprocating piston, for example retaining recesses or holes are developed for attaching a compression spring (see claim 21) The aforementioned stabilization of the meshing between drive pinion and gear rack is assisted by an axisymmetrical arrangement and/or distribution of the engagement means on the outside of the wall (see claim 22).

In order to achieve a compact structural design for the gear housing, according to one optional embodiment of the invention it is provided to insert groove-like recesses in a side of the stroke housing or reciprocating piston that is associated with the gear rack, where such recesses are arranged axially symmetrical and are aligned with each other for the formation of openings for the gear racks (see claim 23). If this is actually realized, the grooved recesses will form a horseshoe-shaped opening profile as it were, which surrounds the gear rack in a specific rotational position of the drive pinion. This involves those rotational position(s), during which the drive projection has the smallest or a relatively small distance relative to the gear rack.

Within the scope of the invention is ultimately the use of the drive pinion with eccentrically mounted drive terminals for reducing the steering angle (so-called progressive gear rack steering). The scope of the invention therefore includes use of a drive pinion provided for meshing into a gear rack of a motor vehicle steering gear, where said drive pinion with a rigidly eccentrically mounted pivotable drive projection on the front face in relation to the pinion teeth, where said drive projection is used for coupling onto a motor vehicle steering shaft or motor vehicle steering wheel for progressive or decompressive gear rack steering, in which an increasing steering wheel turning angle is converted into a to pinion rotation with a changing and a nonlinear increase or decrease of a resulting gear rack pinion travel (see claim 24). Pursuant to an optional development of this application, the rotational position of the drive pinion is adjusted such that the drive projection in an initial position comprises the smallest distance corresponding to straight-line driving and therefore the smallest gear ratio, which then increases with increasing rotation of the steering wheel over-proportionally or progressively in terms of a steering angle reduction (see claim 25).

DESCRIPTION OF THE VIEWS OF THE DRAWINGS

Further particulars, features and advantages of the invention result from the subsequent description of exemplary embodiments of the invention, and from the drawings. The drawings show as follows:

FIG. 4a-4c: show different views of a retaining piece or slide block according to the invention.

FIG. 7: shows a perspective, partially opened-up representation of a steering gear without drive pinion.

FIG. 8: shows a perspective representation of the drive pinion, the retaining piece or the slide block and the reciprocating piston assembled.

FIG. 14a-14f: show cross-sections or opened-up representations of the gear rack in longitudinal view and in plan view for a 0-degree and 180-degree position of a steering gear.

FIGS. 15.1-15.8: show a perspective representation of opened-up instant views of different movement positions of a steering gear.

FIG. 16: is an illustration of the turning angle situations of an eccentrically supported drive pinion in a steering gear, if used according to the to invention.

DETAILED DESCRIPTION OF THE INVENTION

Figure 1:
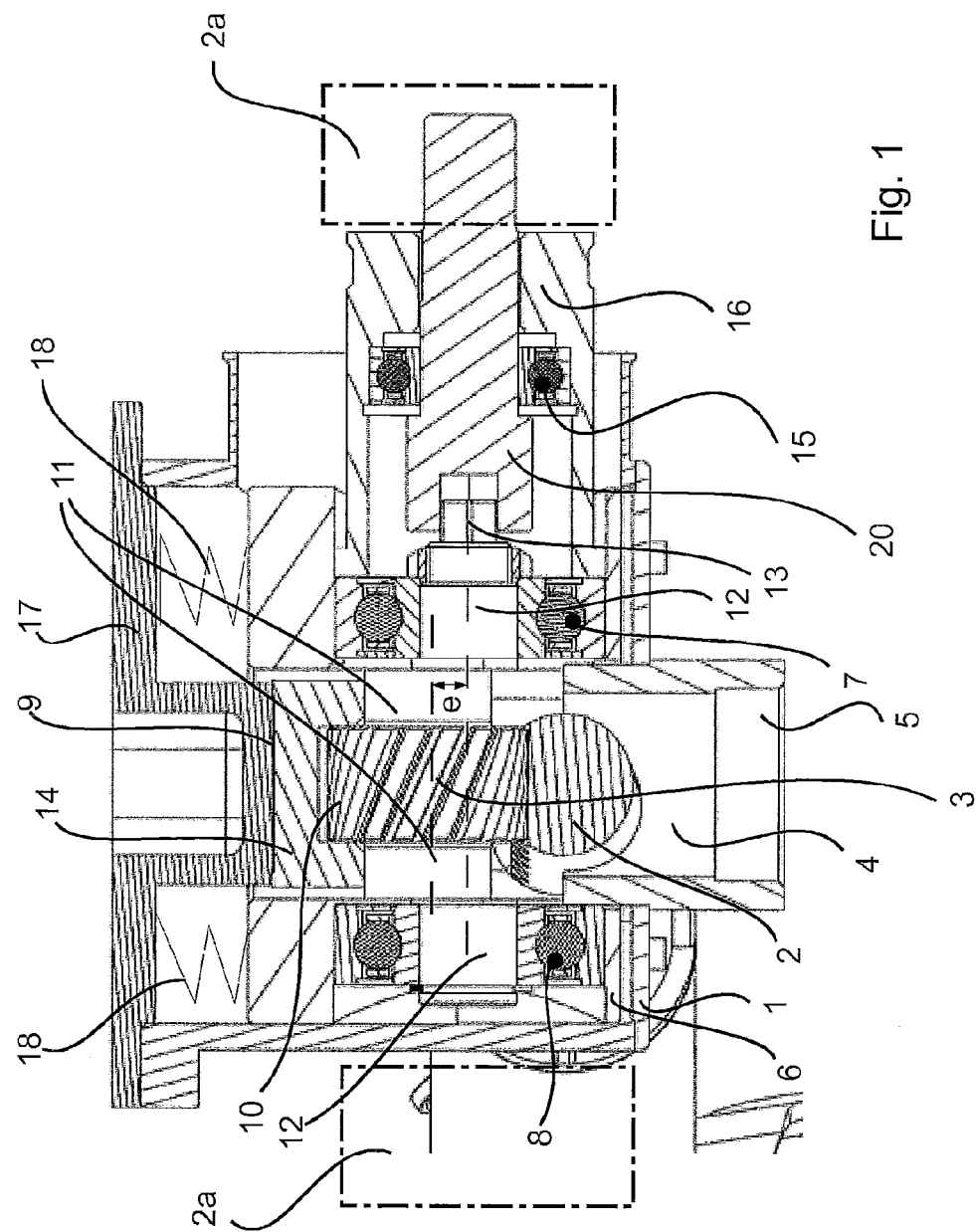
FIG. 1: shows the cross-section of a steering gear in the longitudinal direction of the steering shaft or along the line B-B in FIG. 1a FIG. 1a: shows the steering gear according to FIG. 1 with the closed housing.
Figure 1A:
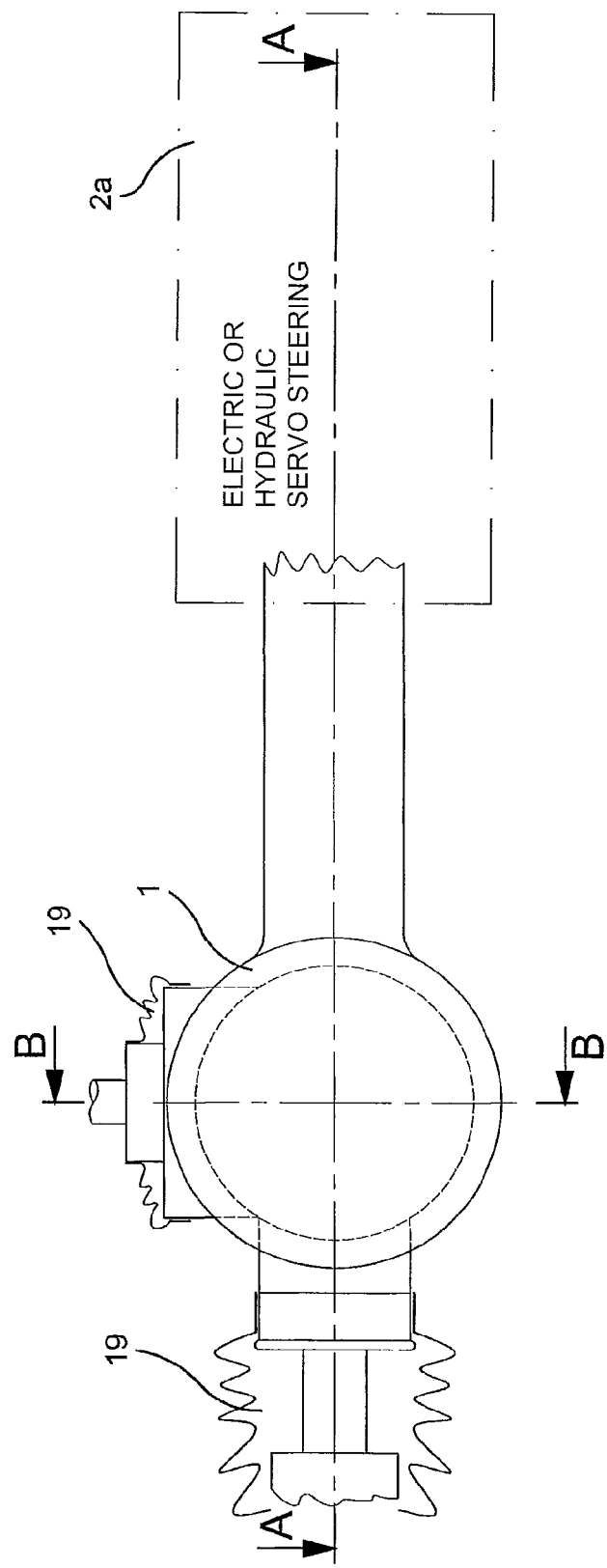

According to FIG. 1, a gear rack 2 and a drive pinion 3 that is meshing with it is housed in a gear housing 1. The drive pinion 3 is provided with a drive projection (bearing spindle) 12 that is eccentrically attached to its front face, which drive projection is also supported eccentrically arranged in a fixed bearing 7. The gear rack 2 is supported and guided in the vicinity of a hydraulic or electric servo steering 2a (schematically shown), as well as by a retaining piece 4, 5. The retaining piece contains a thrust pad 4 for contact onto a bottom side of the gear rack 2 facing away from the drive pinion 3. The thrust pad 4 is disposed within the housing wall and can be adjusted in the direction of the gear rack 2 by a fine-threaded retaining piece 5 contacting the gear rack 2 from outside, so that a certain clearance for the toothing for a sliding block 14 that is still subsequently described, can be adjusted. For that purpose, a reciprocal screw thread engagement between the outer casing of the fine-threaded retaining piece 5 and the inner cylindrical surface of the wall penetration (not drawn) is developed.

According to FIG. 1, the rotational bearing of the drive pinion 3 comprises a fixed bearing 7 on the right, and a floating bearing 8 on the left. With the fixed bearing 7, the inner ring and the outer ring are fixed rigidly, so that axial forces can be absorbed. The floating bearing 8 which according to the drawing is arranged on the left, is not fixed to zero clearance, so that thermal expansion can be absorbed in that way. The eccentric rotational bearing 7, 8 of the drive pinion 3 is located in a guide piston 6 that is guided linear in the gear housing 1, particularly when reciprocating vertically. The drive pinion 3 comprises a gear area 10, a journal 11 for a slide block 14 that is guided form-closed thereon, bilateral, eccentric bearing spindles or bearing projections 12, and a coaxial steering spindle journal 13 with cylindrical serration relative to the bearing spindles 12. The to steering spindle journal 13 serves for coupling of a steering spindle 20, which in the further area can be developed routinely as a cardan shaft with a sliding sleeve for length compensation (see the schematic representations in FIGS. 12a and 12b. In the drawn embodiment, the spindle ball bearing 15 and the flanged block 16 are used for the steering spindle bearing. The latter would have to be expanded is as valve housing for rotary slide valves, if hydraulic steering is used. According to another variant, a rotary slide valve with integrated articulated coupling would have to be flange-mounted.

The compression springs 18 (schematically indicated) push the guide piston 6 down and thus also the drive pinion 3 that is eccentrically supported therein with a specific force, for example 250 N, into the toothing of the gear rack 2. The meshing engagement is secured by means of a slide block 14 that is produced as a separate part, in that the slide block 14 contacts the bottom side of a backstop cover 17 so that it can be shifted by sliding. The slide block 14 can therefore be reciprocally moved within the guide piston 6 exclusively parallel at a constant distance to the gear rack along the bottom side of the backstop cover 17, according to the eccentricity e (also see FIG. 13 further below). During steering movements, this is done within the vertically reciprocating guide piston 6 against the compression springs 18. During normal driving operation, the meshing engagement operates with zero clearance, due to the persistently applied load of the compression springs 18.

Depending upon the steering angle, the bearing piston or guide piston 6 executes a reciprocating vertical movement that corresponds to the eccentricity e of the drive journal 12. The slide block 14 "rides" above complementary concavities (see FIGS. 4a and 4b), for example with a clearance of 0.1 mm, on the journals 11 are concentrically mounted respectively on a front face of the drive pinion 3, and slides along a slideway 9 that is formed from the outside of the slide block 14 and the opposite bottom side of the backstop cover 17. The linear component movements of the drive pinion 3 with the slide block 14 that is in form-closed engagement with same that are indicated along or relative to the gear rack 2. But if a greater disturbing force occurs, such as is exerted on the steering system for example during parking along the curb, then this disturbing force acts against the springs 18, and the slide block clearance becomes zero. Then the slide block 14 absorbs the force. Depending upon the direction of the disturbing force, also the thrust pad 4, which can be adjusted from the fine threaded retaining piece 5, can absorb an increased force. In this case, the slide block clearance remains 0.1 mm, for example.

It follows from the above explanations, that the steering spindle is journal 13 can execute a reciprocal vertical motion with the universal joint connection that corresponds to the eccentricity e, and a rotation of +/− and 225° degrees, for example. A corrugated bellows 19, as arranged as indicated in FIG. 1, is useful for sealing the steering system.

Figure 2:
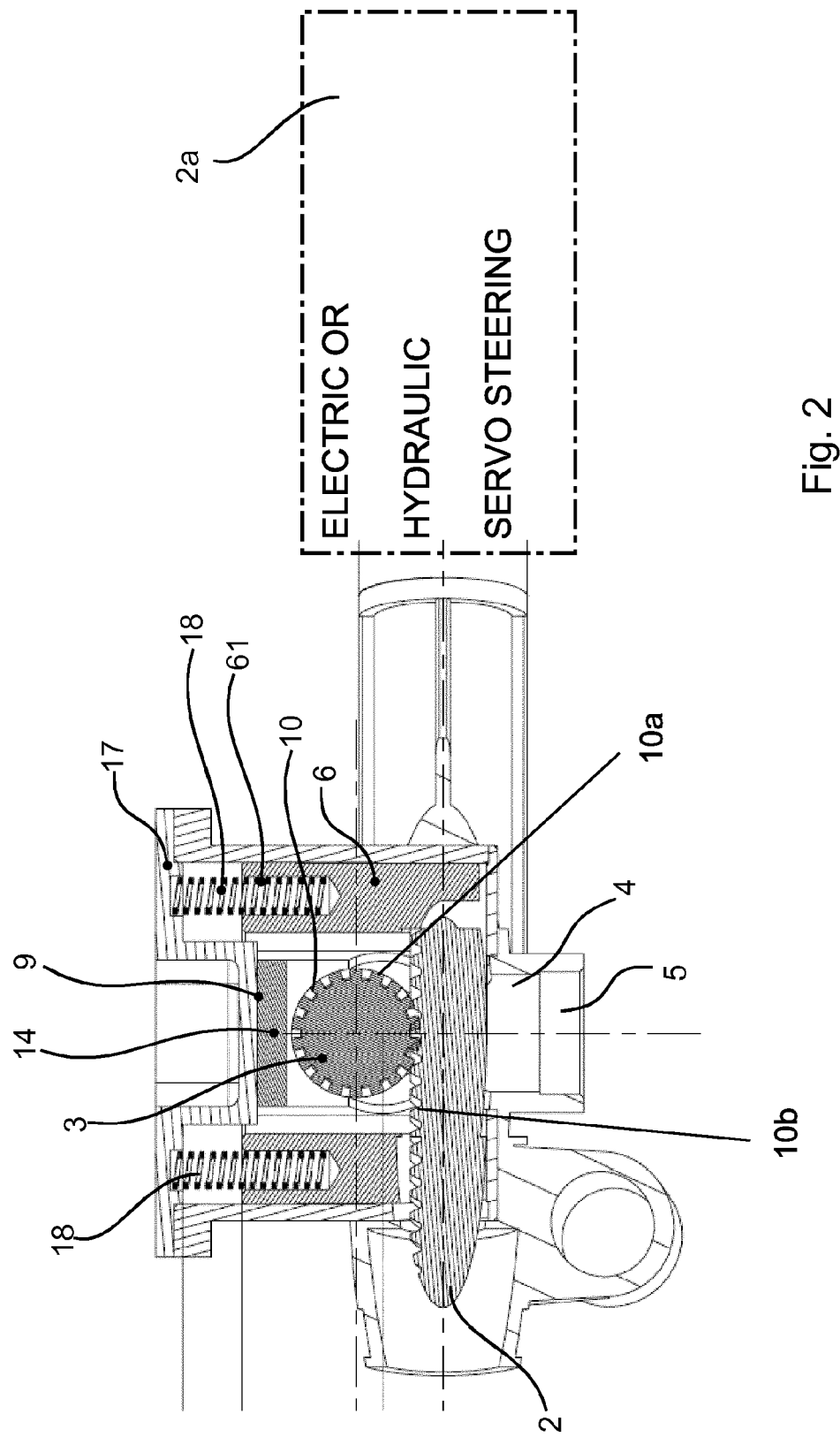
FIG. 2: shows the steering gear as a cross-section in the longitudinal direction of the gear rack or along the line A-A in FIG. 1a FIG. 3a-3d: show different views of a drive pinion according to the invention
Figure 3B:
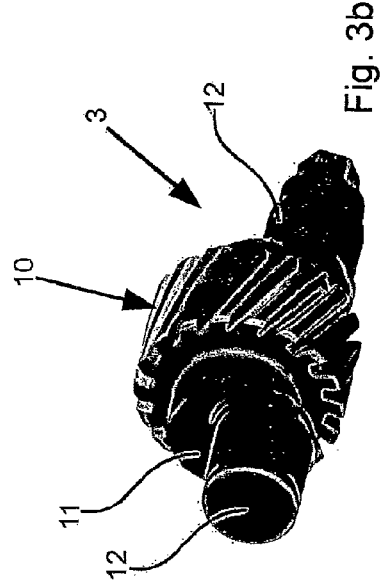
Figure 3D:
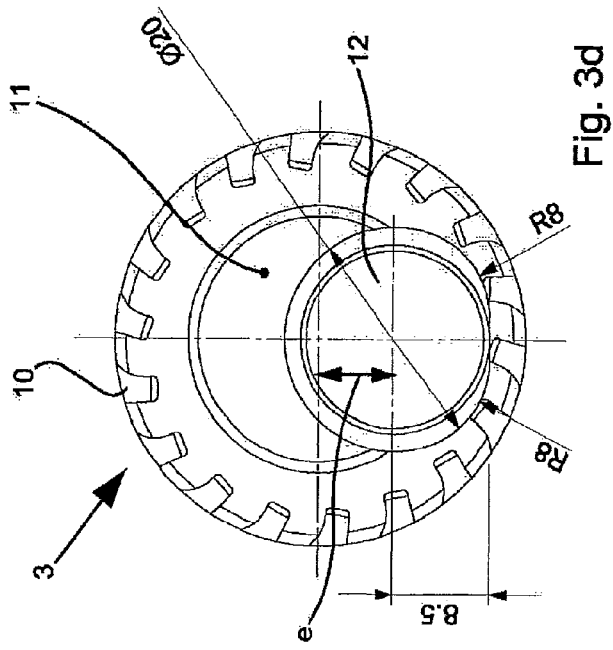
Figure 3A:
Figure 3C:
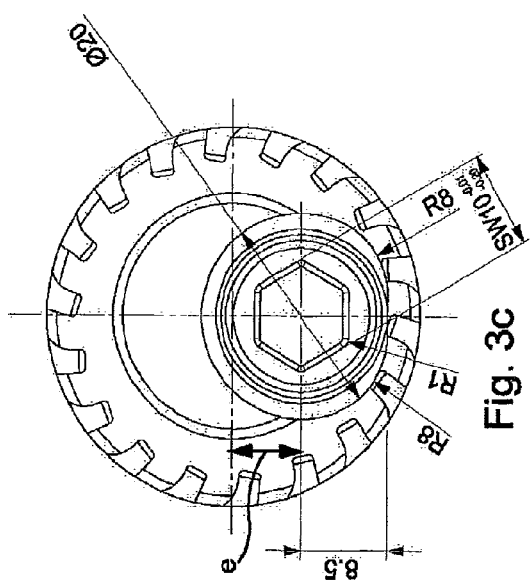

According to FIG. 2, the compression springs 18 are supported against one bottom side of the backstop cover, on the one hand, and in the locating holes 61 of the guide piston 6, on the other. From the hatched area in the drawing it can be seen that the backstop cover is a loose part.

According to FIG. 3a-3d, each front face of the drive pinion is provided with a concentrically attached journal, and an eccentric bearing spindle 12 is molded on the respective front face of said journal. That bearing spindle 12 which terminates as a polygonal projection, serves as the drive projection for the steering spindle attachment. The eccentricity e is drawn in FIGS. 3c and 3d in each case, which shows the amount of offset of the bearing spindle pins 12 center symmetry axis of the pinion drive 3 compared to the center symmetry axis or its pinion teeth 10a. Moreover, the helical toothing can be recognized in the gear area 10.

According to FIG. 4a-4c, the retaining piece or slide block 14 has a U-shaped basic form with the two U-shanks 141, which can be particularly recognized from FIG. 4b. Each of its narrow side has a concave curvature 142, the curvature or radius of which is configured complementary to the respective outer casing of the journals 11 of the drive pinion 3. This enables the slide block 14 to "ride" form-closed on the journals 11 of the drive pinion 3 form-closed. To ease or promote the sliding motions, lubrication grooves 143 are formed both on the top side of the slide block 14, which is assigned to the bottom side of the backstop cover 17, as well as in the concave curvature 142 that borders the narrow side, which is assigned to the outer casing of the pinion drive 3 journals 11. The lubrication grooves can be filled up with lubricant for steering operation.

Figure 5C:
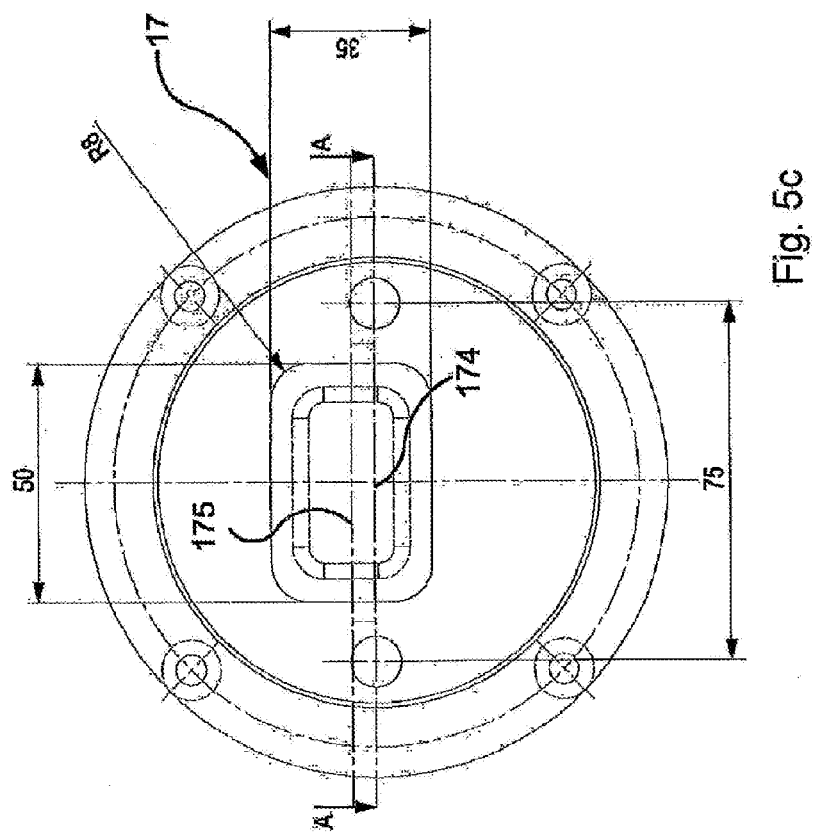
FIG. 5a-5c: show different views of a housing cover according to the invention.
Figure 5A:
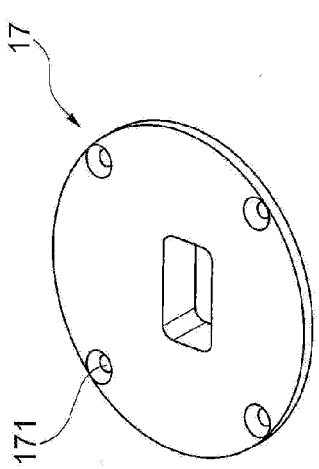
Figure 5B:
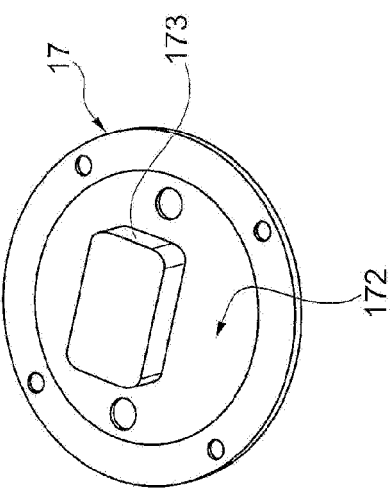
Figure 6D:
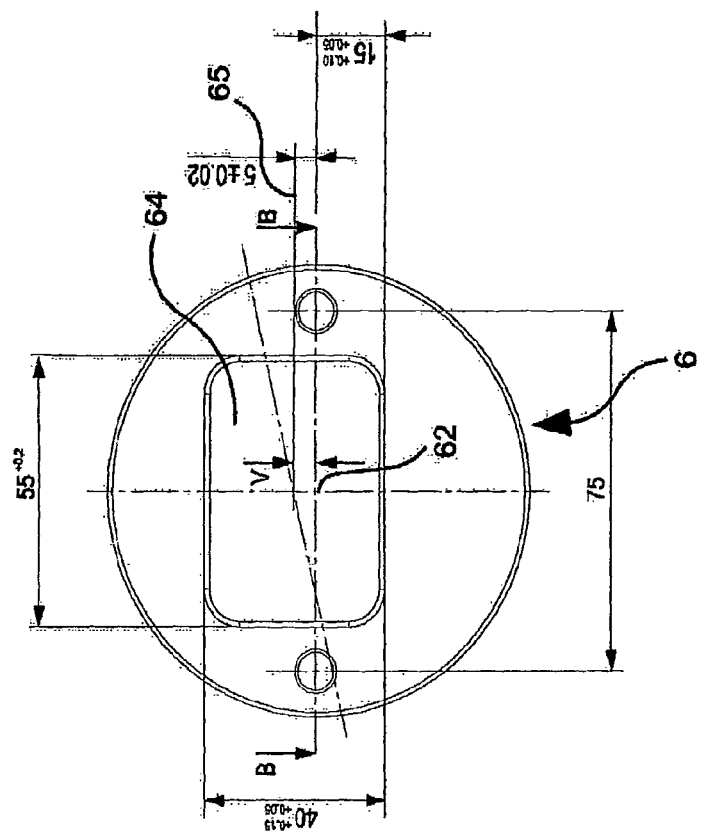
FIG. 6a-6d: show different views of a reciprocating piston according to the invention.
Figures 6A, 6B, 6C:
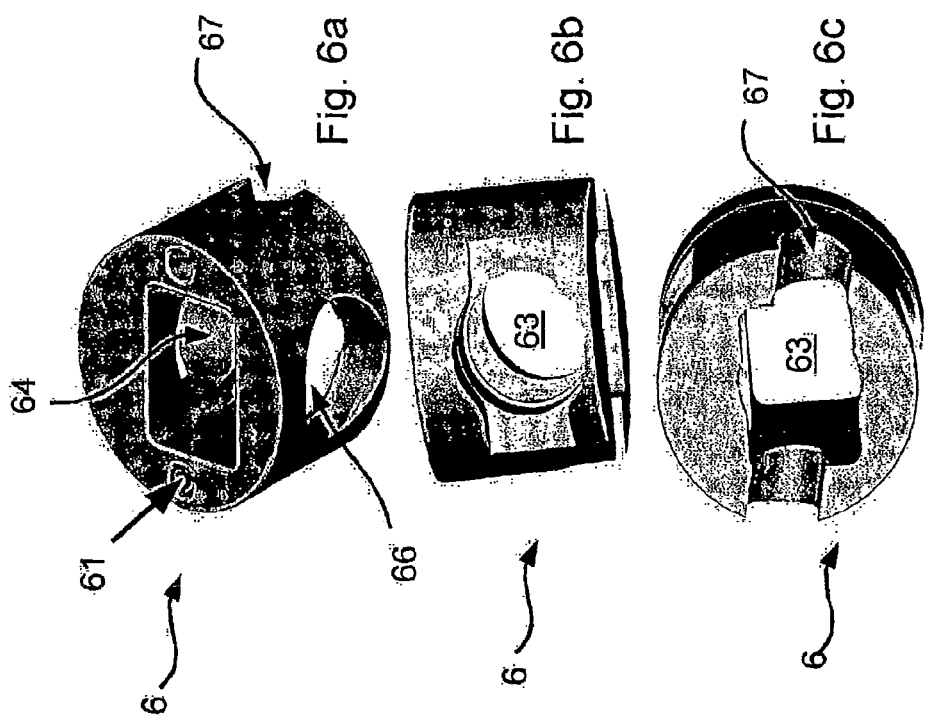

According to FIGS. 5a-5c, the backstop cover 17 has screw holes 171 in the peripheral position for attachment on the gear housing. Furthermore, a inner projection 173 protrudes on its inner side 172 that is facing the inside of the housing, said inner side has a slideway 9 that is assigned to the slide block 14, were said slideway is offset inward with respect to the cover base area. Furthermore, the backstop cover 17 is configured with a circular disc-like basic form with the center symmetry axis 174, opposite of which lies the inner projection 173 with its center longitudinal axis radially offset.

Pursuant to FIG. 6a-6d, the guide piston 6 is configured with a cylindrical basic form. The above-mentioned compression springs 18 can be evenly or symmetrically balanced applied in the axially parallel locating holes 61 that are diametrically opposite with respect to a center longitudinal symmetry plane 62, said locating holes were previously addressed. A rectangular inlet recess 64, the edges of which are rounded, leads to a hollow space 63 of the cylindrical guide piston 6. Said rectangular inlet recess comprises a basic layout that is complementary to the external profile of the inner projection 173 of the backstop cover 17, so that latter, by means of the Internet recess 64 in the direction to the mounting space 63 and being in sliding contact with the slide block 14, can form a slideway 9. Therefore, in steering operations, the inner projection 173 of the backstop cover 17 together with the top side of the slide block 14, can together form the slideway 9. Opposite of the center longitudinal symmetry plane 62 of the cylindrical guide piston 6, the inlet recess 64 with its center longitudinal axis or symmetry line 65 is arranged offset by an offset v.

The cavity 63 of the guide pinion 6 is sized for holding the drive pinion 3 with exterior gear area 10, wherein for holding its bilateral rotational bearing 7, 8 (see above) wall recesses 66 are formed that are diametrically opposite or are diametrically aligned with each other. They have a circular cylindrical basic form that is adapted the outer ring of ball bearings, and respectively lead to the mounting space 63 of the guide piston 6.

The guide piston 6 is configured with groove-like passage recesses or transit cutouts 67 on its front face that is facing away from the locating holes 61 or the inlet recess 64, said cutouts being configured to form a common passage alignment for the gear rack 2. This passage alignment is particularly relevant at a stage when the guide piston as part of its vertical reciprocal movements is in the lowest position or in a position closest to the gear rack 2.

Figure 9:
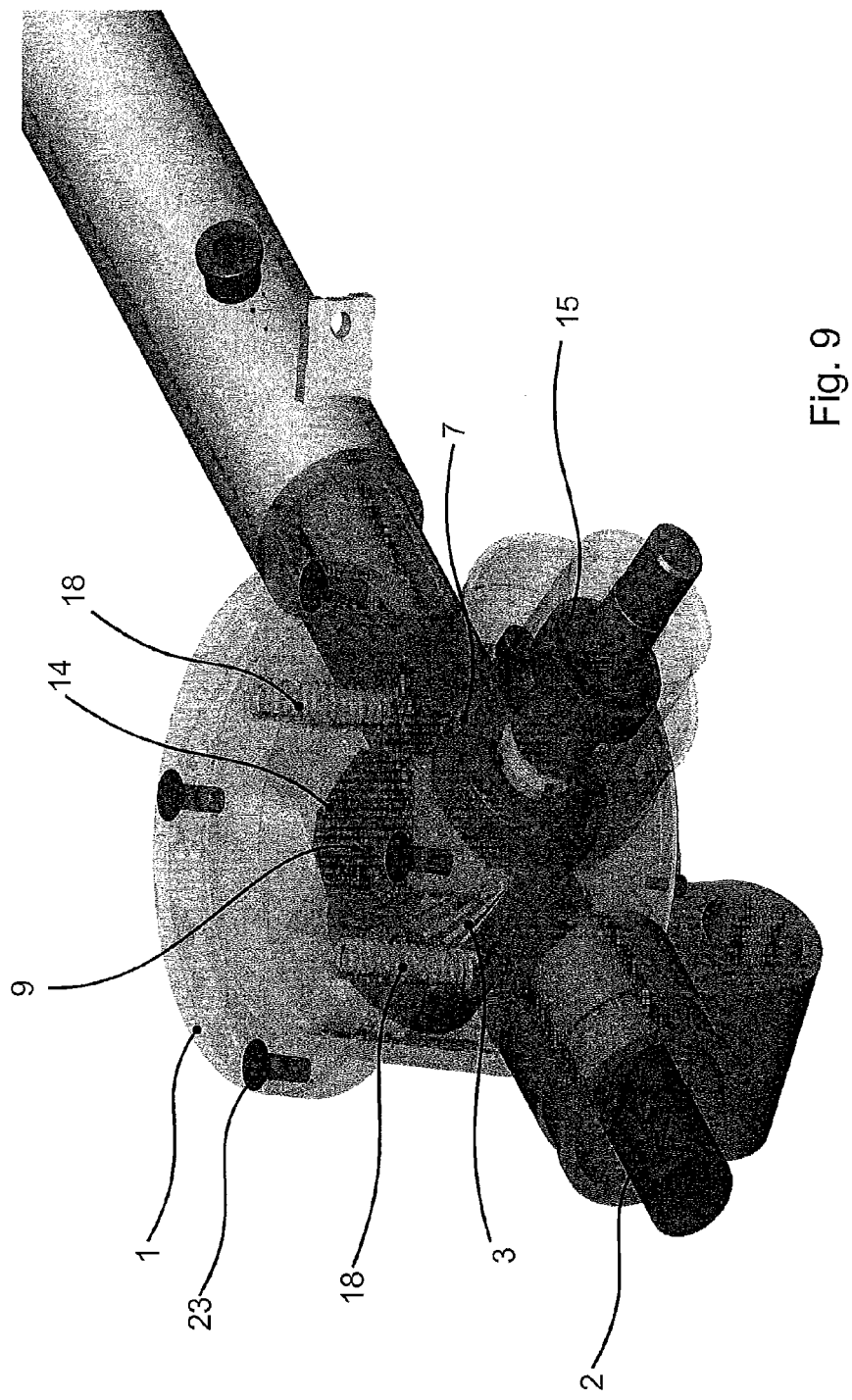
FIG. 9: shows an example of a steering gear according to the invention as a perspective, partially transparent representation, in the assembled condition.
Figure 10:
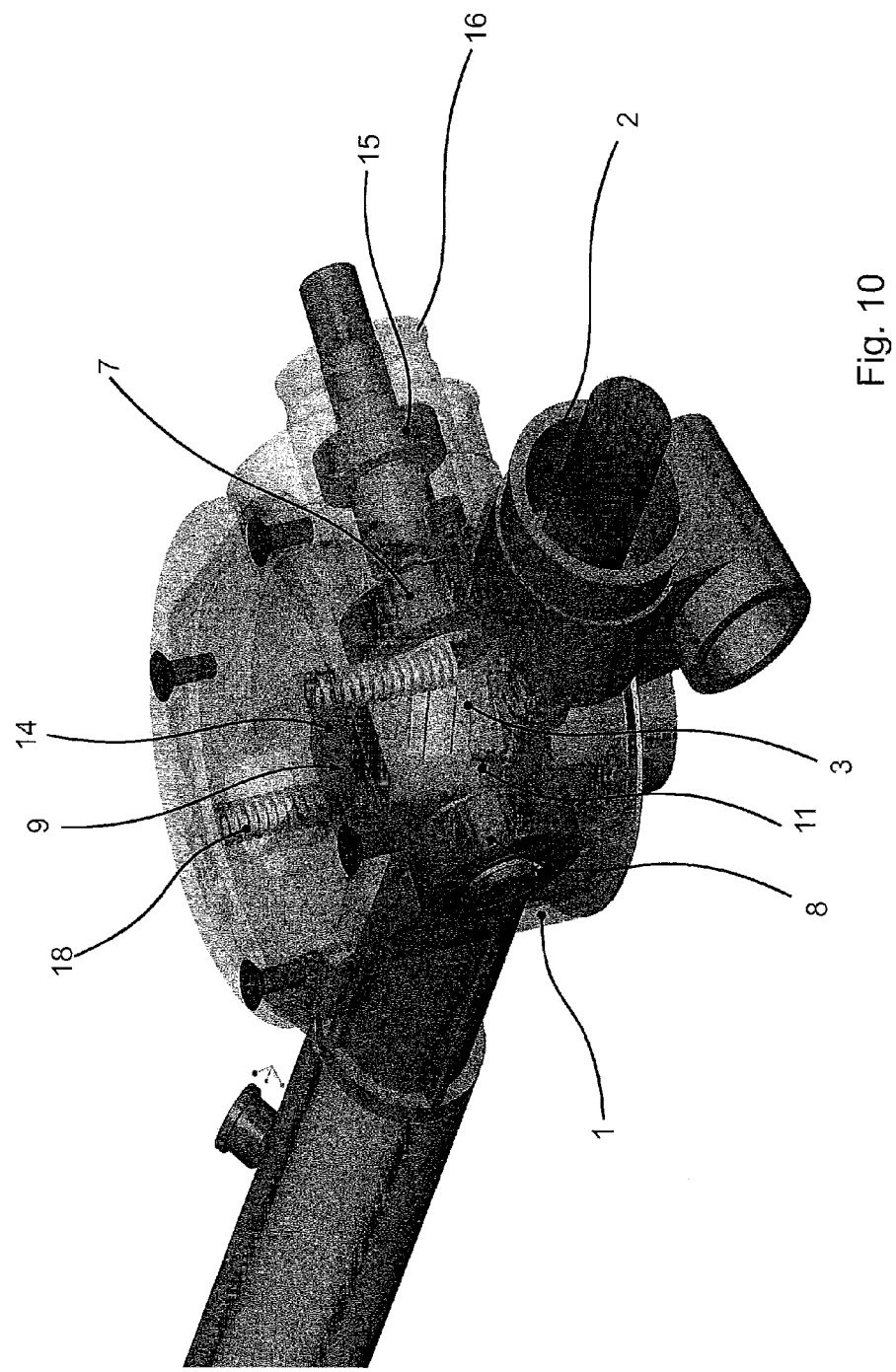
FIG. 10: shows the steering gear according to FIG. 9 in a different view, in the corresponding perspective, transparent representation, in the assembled state.
Figure 11:
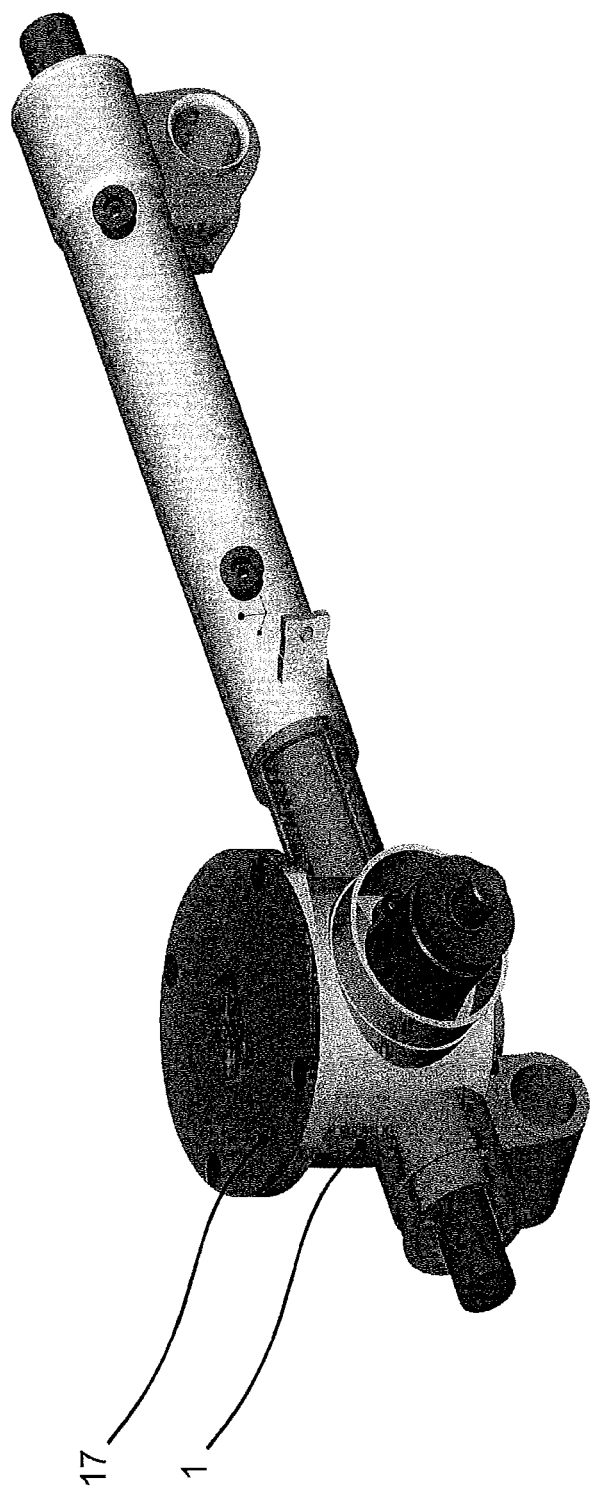
FIG. 11: shows an exemplary steering gear according to the invention in a perspective representation in the assembled state with a closed housing.

FIG. 7 illustrates the still incomplete steering gear with a freely accessible gear rack 2. This can be used for the meshing of drive pinion 3, wherein according to FIG. 8 same is surrounded by the retaining or slide block 14 as well as by the guide piston 6, according to the invention. It can be derived moreover from FIG. 9, that by using connecting screws 23, the loose backstop cover 17 must still be screwed on for forming the slideway 9. By the way, the reference symbols used in FIGS. 7-11, refer to parts corresponding to the previous explanations, so that no further comments are necessary.

Figure 12A:
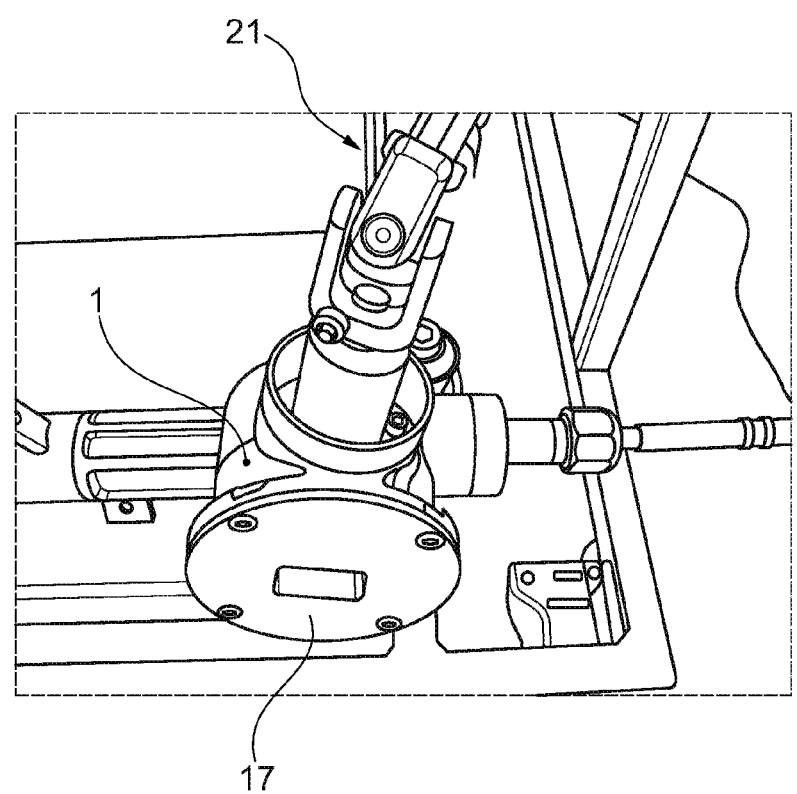
FIG. 12a: shows a perspective representation of the method of coupling a steering shaft onto an exemplary steering gear according to the invention, by means of a universal joint.
Figure 12B:
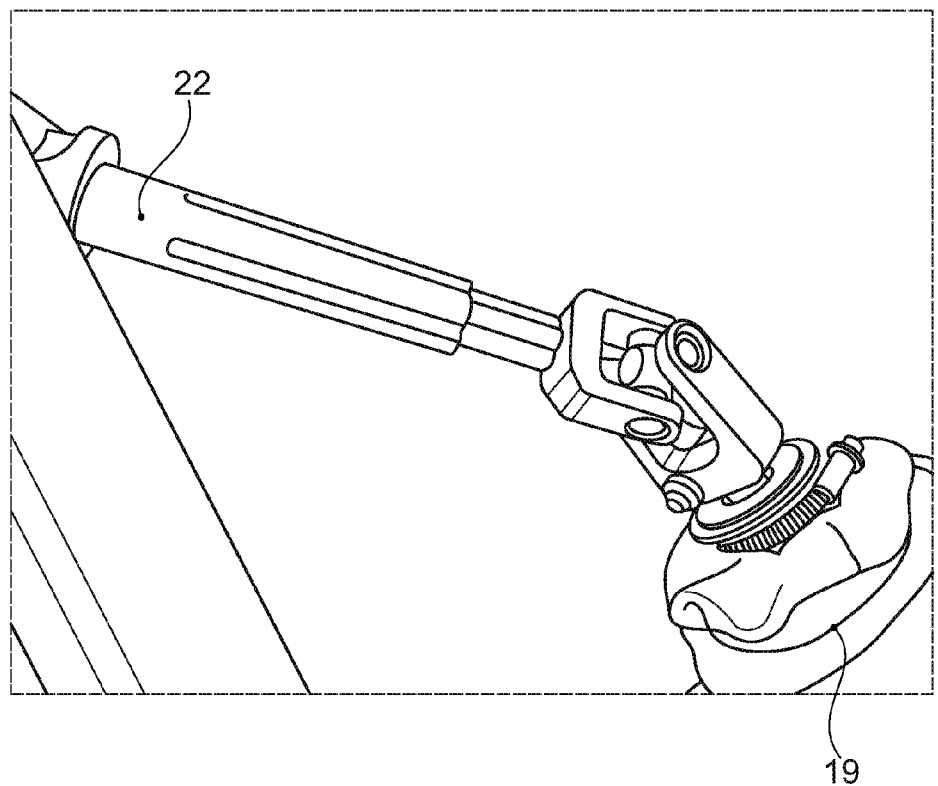
FIG. 12b: shows a corresponding but enlarged view according to FIG. 12a with the universal joint and sliding sleeve for coupling the steering shaft onto the steering gear or onto the drive pinion.

Pursuant to FIGS. 12a and 12b, by means of a universal joint 21, a sliding sleeve 22 is used for the purpose of combination with the eccentrically driven drive pinion 3. By means of the sliding sleeve 22, it is conceivable that the reciprocal vertical movements of the bearing spindle or of the drive projection 12 can be absorbed or compensated with respect to the steering wheel operator. Regarding the universal joint 21 and the sliding sleeve 22, this involves parts or components that are generally known in steering gear engineering technology, so that any additional explanations are superfluous.

Figure 13:
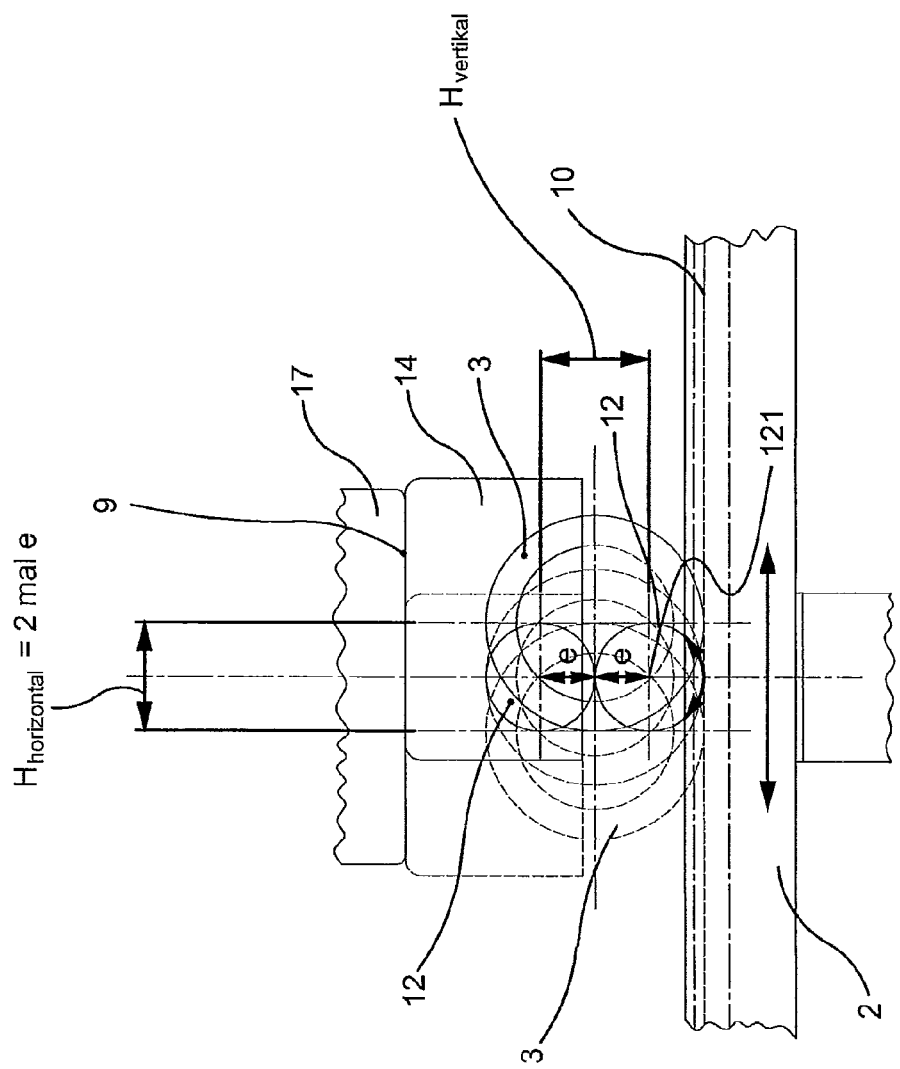
FIG. 13: is a schematic view transverse to the gear rack with the representation of different movement positions.

FIG. 13 illustrates the principle of movement by means of a rough schematic representation. The bearing spindle or drive projection 12 with its axis of rotation 121, can only move up and down because of its forced operation, namely by the eccentricity e in each case. The uppermost position of the eccentric drive projection 12 could correspond to a 180° degree steering angle and the lowest position with minimum distance to the gear rack 2, to a 0° degree steering angle for straight-line driving. In the course of the steering movements by the driver, in the drawings according to FIG. 13, the drive pinion 3 migrates to the right, relative to gear rack 2, and to the left, on the other (the latter is indicated by dotted lines), wherein it rolls-off in the gear area 10 of the gear rack. The maximum migration of the drive pinion 3 to the right relative to gear rack 2 could correspond to a steering angle of approximately 90° degree, and the maximum migration of the drive pinion 3 to the left could correspond to a steering angle of approximately −90° degree in the other direction of rotation. The corresponding is drift stroke $H_{horizontal}$, which has double the eccentricity e, forms a linear component motion of the drive pinion 3 during steering operations relative to gear rack 2 and runs approximately transverse in relation to the vertical stroke $H_{vertical}$ of the axis of rotation 121 of the drive projection 12.

FIGS. 14a-14c illustrate the steering gear in the 0 degree initial position for straight-line driving. In this context, as can be recognized from FIG. 14c, the bearing spindle or drive projection 12 comprises a minimum distance to gear rack 2 or to its horizontal datum level. According to FIG. 14a, the compression springs 18 are deflected to the maximum. In the position represented in FIGS. 14d-14e, with a steering angle deflection of 180 degrees, the guide piston 6, compared to the 0 degree position pursuant to FIG. 14a, is offset towards the top, and the bearing spindle or drive projection 12 has a maximum distance to gear rack 2 or to its horizontal datum level. According to FIG. 14e, the drive pinion 3 has migrated towards the right, relative to gear rack 2, wherein this results in a corresponding gear rack offset Z towards the left.

In the snapshot according to FIG. 15.1, the steering gear has a position for straight-line driving. For purposes of illustration, an arrow-shaped marking M has been applied on the steering spindle journal 13, which points vertically up corresponding to straight-line driving. The guide piston 6 is in its lowest position with a minimum distance to gear rack 2 or its horizontal datum level. In this context, because of the load of the compression spring system 18, stabilization occurs in this position pursuant to FIG. 15.1, and the retaining piece or sliding block 14 has adopted an intermediate position relative to the compression springs. According to FIG. 15.2, the steering wheel is turned to the right or clockwise by approximately 90 degrees, wherein the sliding block 14 is moved linearly to the right within the guide piston 6, according to the drawing. Corresponding with that and because of the forced operation of the eccentrically mounted bearing spindle or drive projection 12, the drive pinion 3 has also migrated to the right. The guide piston, because of the absorbed fixed/floating bearing 7, 8 absorbed by it which surrounds the eccentric bearing spindles 12, has been offset vertically to the top, wherein the compression springs 18 are being compressed. Pursuant to FIG. 15.3, the steering wheel and the steering spindle journal 13 coupled to it, is turned further to the right, by approximately 180 degrees. For this purpose, the guide piston 6 has reached its uppermost position under further compression of the compression springs 18. Riding on the concentric journal 11 together with the drive pinion 3, the sliding block 14 has migrated into its intermediate position again. Now the gear rack 2 has extended by the gear rack offset Z, corresponding to the 180 degree steering angle. According to FIG. 15.4, this gear rack extension has even increased further, in that the steering wheel or the steering spindle journal 13 were turned even further clockwise, beyond the 180 degree position. In this context, the sliding block 14 has moved left from its intermediate position, while the guide piston is offset to the bottom again by the eccentric rotational bearing 7, 8 and by the pressure of the springs 18. Pursuant to FIG. 15.5, the steering angle has been reset again almost into the O degree position for straight-line driving. The sliding block 14 is almost in the intermediate position, and the guide piston 6 has meanwhile been offset towards the bottom, by further deflection of the compression spring action 18. In this context, the advantageous functionality of the compression springs 18 becomes clear, that is to automatically initiate the return into the initial position with a steering angle equal to 0 degrees, or at least support this return. Pursuant to FIG. 15:6, now a steering angle deflection to the left, counterclockwise by approximately 90 degrees, is executed. Accordingly, the sliding block 14 riding on the concentric journal 11, has migrated to the left within the guide piston 6. The latter, because of the fixed/floating bearing 7, 8 of the bearing spindles 12 absorbed in its wall, has been offset again from its lowest position to the top, wherein the compression springs 18 are being compressed. Because of the left turn, the gear rack 2 is now offset to the right (see arrow). Pursuant to FIG. 15.7, a steering angle deflection of approximately 180 degrees to the left has almost been obtained, and the sliding block 14 has returned into an approximate intermediate position again. The guide piston 6 is moved from the eccentric bearing spindles 12 into the uppermost position, under maximum pre-loading of the compression springs 18. According to FIG. 15.8, the previous steering angle deflection to the left has been almost reversed again, wherein the sliding block 14 on the journal 11 has occupied the intermediate position again, according to FIG. 15.1. The compression springs 18, using maximum external control, push the guide piston 6 into the lowest position, while at the same time stabilizing the 0 degree steering angle for straight-line driving. In other respects, the explanations is regarding clockwise turning are applicable accordingly.

It can also be derived from the preceding that in the steering range from 0-+/−180 degrees the steering is automatically returned to 0 degrees by the compression springs 18, i.e. the traditional torsion bar with conventional steering gear is no longer required here.

FIG. 16 shows the steering angle situation, which reveals arc lengths which during the meshing engagement are progressively converted into increasing pinion travel of the gear rack 2.

Figure 17:
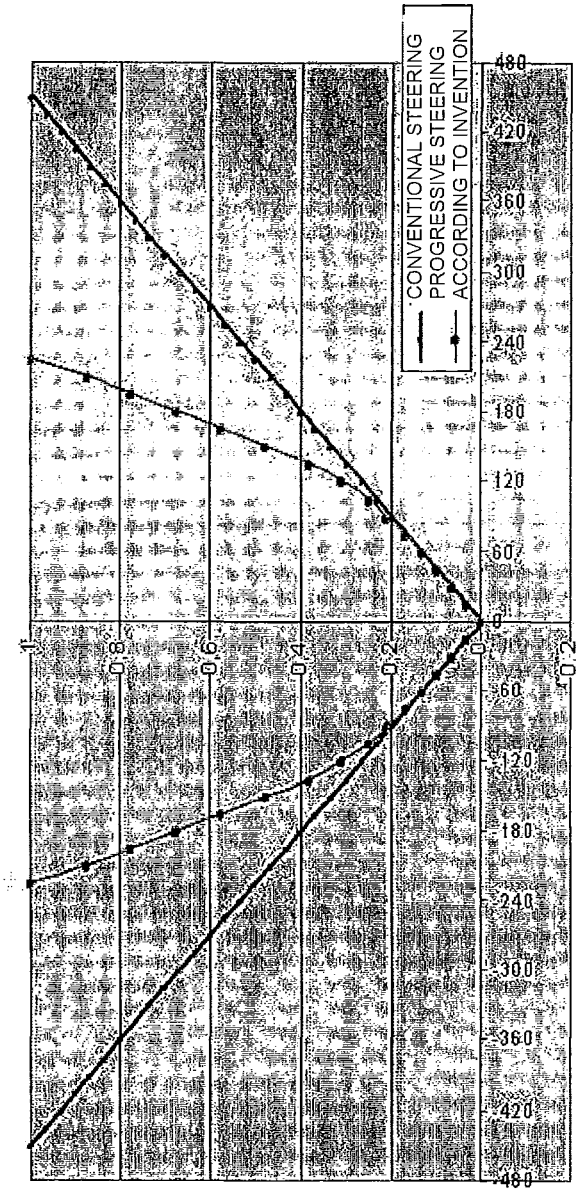
FIG. 17: shows a steering diagram for the steering gear.

In the steering diagram according to FIG. 17, steering wheel turning angles to the left and to the right are entered on the X-axis and the relative pinion travel are entered on the Y-axis. On the Y-axis, the maximum gear rack pinion travel ends at value 1. In conventional steering systems, a maximum steering angle stop of +/−450 degrees for steering wheel turns of 1.25 to the left and to the right is known. In this context, the diagram shows that a linear relationship exists between the amount of steering wheel deflection or steering wheel angle and the pinion travel obtained. Compared to that, the invention achieves the advantage that with increasing steering wheel deflection or turning angle, the pinion travel increases "progressively" over-proportionally, as can be recognized from the parabolic shape of the curve in the steering diagram pursuant to FIG. 17. Therefore, for example with 0.625 steering wheel turns (either to the right or to the left), it is possible to obtain a maximum steering angle already up to the stop of +/−225 degrees. Therefore, by using the invention, it is possible to create a steering system which cuts the necessary steering wheel turns from the left stop to the right stop in half, wherein the steering stability is maintained during straight-line driving and in slight curves, almost as known. Larger steering angles of the steering wheel will create progressively greater pinion travel of the gear rack, so that the amount of steering wheel turns necessary for maneuvering or parking are practically halved. This will produce a significant increase in driving comfort. To obtain lower steering forces on the steering wheel, electrical or hydraulic servo steering is useful, as known.

LIST OF REFERENCE SYMBOLS

1 Gear housing
2 Gear rack
2a Steering assist
e Eccentricity
3 Drive pinion
4 Thrust pad
5 Fine-threaded retaining piece
6 Guide piston
61 Locating holes
62 Center longitudinal symmetry plane
63 Mounting space
64 Inlet recess
65 Center longitudinal axis
v Offset
66 Wall recesses
67 Transit cutouts
7 Fixed bearing
8 Floating bearing
9 Slideway
Gear area
10a Pinion teeth
10b Gear rack teeth
11 Journal
12 Bearing spindle
121 Axis of rotation
$H_{horizontal}$ Drift stroke
$H_{vertical}$ Vertical stroke
Z Gear rack offset
13 Steering spindle journal
14 Slide block
141 U-shank
142 Concave curvature
143 Lubrication grooves
15 Spindle ball bearing
16 Flanged block
17 Backstop cover
171 Screw holes
172 Inner side
173 Inner projection
174 Symmetry axis
175 Center longitudinal axis
18 Compression spring
19 Corrugated bellows
20 Steering spindle
21 Universal joint
22 Sliding sleeve
23 Connecting screw
M Marking

The invention claimed is:

1. A motor vehicle steering gear, comprising a gear rack (2) and a drive pinion (3) that meshes with the gear rack, which drive pinion has a drive projection (12) in a rotational bearing (7) for coupling a motor vehicle steering shaft, the drive projection being rigidly attached at an end face to pinion teeth (10a), the rotational bearing (7, 8) being guided in a direction transverse to a front face that is formed by the pinion teeth (10a), so that when the pinion rotates, compensation strokes ($H_{vertical}$) are specified in the a direction transverse to the gear rack (2), said compensation strokes being caused by an eccentric attachment of the drive projection (12), characterized in that a retaining projection (11) is rigidly attached at an end face concentrically to the pinion teeth (10a), the retaining projection being rotatably in engagement with a retaining piece (14) that is guided within a gear housing (1) parallel to gear rack teeth (10b), and pinion rotation for the retaining projection (11) compensation strokes ($H_{horizontal}$) are set parallel with and at a constant distance from the gear rack teeth (10b), said compensation strokes ($H_{horizontal}$) being caused by the eccentric attachment of the drive projection (12).

2. The steering gear according to claim 1, characterized in that the gear housing (1) comprises a backstop section on its inside that is opposite the retaining piece (14), said backstop section being for the parallel guidance of the retaining piece (14).

3. The steering gear according to claim 2, characterized in that the inside of the gear housing (1) opposite the retaining piece (14) is formed as a loose or separate housing cover or backstop cover (17) with the interior backstop section.

4. The steering gear according to claim 3, characterized by a bilateral attachment of retaining projections (11) on each front face of the drive pinion (3).

5. The steering gear according to claim 4, characterized in that the retaining piece (14) is a loose separately manufactured slide block, with a basic form shaped like a U to surround the front face of the drive pinion (3) with U-shanks (141), wherein one or two shanks of the U-shaped slide block are shaped for form-closed gliding on each retaining projection (11).

6. The steering gear according to claim 5, characterized in that the compensation strokes ($H_{horizontal}$) of the drive projection (12) and a steering spindle (20) coupled onto it can be optionally picked up by means of a universal joint (21) using a sliding sleeve (22), wherein the steering spindle (20) can be telescopically guided.

7. The steering gear according to claim 6 wherein the drive pinion (3), is covered with external concentric pinion teeth (10a), and with a drive projection (12) which is arranged or formed for coupling to a motor vehicle steering spindle (20), said drive projection being rigidly attached to the pinion teeth, characterized by one or several retaining projections (11) which in each case are rigidly attached on the front face (11) concentric to the pinion teeth (10a).

8. The steering gear according to claim 7, characterized in that the drive projection (12) is eccentrically attached on the front face of the retaining projection (11).

9. The steering gear according to claim 8, wherein the drive pinion is jacketed with an external, concentric pinion teeth (10a), with the drive projection (12) that is rigidly attached on one front face and that is concentrically arranged or developed eccentrically relative to the pinion teeth (10a) for coupling onto a motor vehicle steering spindle (20), characterized by a rotational bearing projection that is rigidly attached on the other front face eccentric to the pinion teeth (10a), said rotational bearing projection being shaped for holding a rotational bearing (8).

10. The steering gear according to claim 9, characterized in that the drive projection and the bearing projection lie commonly aligned parallel to the center or symmetry axis of the pinion teeth (10a).

11. A motor vehicle steering gear comprising a gear rack (2) and a drive pinion (3) that meshes with the gear rack for coupling to a motor vehicle steering spindle (20), the drive projection being rigidly attached at a front face and eccentric to the pinion teeth (10a) in a rotational bearing (7) being guided in a direction transverse to the gear rack (2) and parallel to a plane of rotation that is formed by the pinion teeth, so that when the pinion rotates, compensation strokes ($H_{vertical}$) are specified in a direction transverse to the gear rack (2), said compensation strokes being caused by eccentric attachment of the drive projection(12), characterized by a compression spring (18), which is supported on a gear housing (1) and that is coupled with the rotational bearing (7) such that a compression spring system (18) presses the drive pinion (3) with its pinion teeth (10a) into the a gear area (10) of the gear rack (2) and counteracts the compensation strokes ($H_{vertical}$) of the rotational bearing (7) for the purpose of resetting the drive pinion (3) into an initial rotational position.

12. The steering gear according to claim 11, characterized in that the one or several rotational bearings (7, 8) are seated in a stroke housing or guide piston (6) corresponding to the compensation strokes ($H_{vertical}$), and that the compression spring system (18) is applied on the stroke housing or the guide piston (6).

13. The steering gear according to claim 12, characterized in that on the front face of the drive pinion (3) opposite the drive projection (12) a rotational bearing projection (12) is rigidly attached eccentrically relative to the pinion teeth (10a) and can be seated in the guide piston (6) or in a separate second guide piston that is guided corresponding to the compensation strokes ($H_{vertical}$).

14. The steering gear according to claim 13, characterized in that the compression spring system (18) comprises several separate compression spring elements, which symmetrically attach onto a guide piston (6) or onto one of each of the separate guide pistons.

15. The steering gear according to claim 14, characterized by an adjustable retaining piece (4, 5), which attaches onto a side of the gear rack (2) that is facing away from the drive pinion (3).

16. The steering gear according to claim 15, characterized in that the retaining piece (4, 5) penetrates a wall of the gear housing (1) that is accessible from the outside and for that purpose is engaged with an internal thread in the wall so that said retaining piece can be adjusted.

17. The steering gear according to claim 16 wherein the stroke housing or the guide piston (6) comprises a mounting space (63), which is designed for holding at least one linear reciprocating drive pinion (3) with pinion teeth (10a).

18. The steering gear according to claim 17, characterized in that the mounting space (63) is designed for holding at least one linear reciprocating drive pinion (3), which reciprocates with double the eccentricity (e), with which the drive projection (12) lies offset relative to a center rotational axis (121) of the pinion teeth (10a).

19. The steering gear according to claim 18, characterized in that the mounting space (63) is designed for holding a reciprocating retaining piece (14) that is parallel to the gear rack (2) with the drive pinion (3) or is engaged form-closed with said retaining piece.

20. The steering gear according to claim 19, characterized by one or several wall recesses (66) that are leading to the mounting space (63), each of which said wall recesses is designed for holding a rotational bearing (7, 8) for the drive pinion (3).

21. The steering gear according to claim 20, characterized by one or several engagement means developed on the outside of the steering gear for application by a compression spring system (7, 8).

22. The steering gear according to claim 21, characterized by an axisymmetrical configuration or distribution of the engagement means on the outside.

23. The steering gear according to claim 22, characterized by several groove-like penetration recesses that are embedded in a side assigned to the gear rack for forming gear rack penetrations that are aligned with each other.

* * * * *